(12) United States Patent
Morten

(10) Patent No.: US 8,079,646 B2
(45) Date of Patent: Dec. 20, 2011

(54) VEHICLE OR TRAILER

(76) Inventor: John Edward Morten, High Peak (GB)

( * ) Notice: Subject to any disclaimer, the term of this patent is extended or adjusted under 35 U.S.C. 154(b) by 1116 days.

(21) Appl. No.: 11/574,662

(22) PCT Filed: Sep. 2, 2005

(86) PCT No.: PCT/GB2005/003393
§ 371 (c)(1),
(2), (4) Date: Aug. 31, 2007

(87) PCT Pub. No.: WO2006/027556
PCT Pub. Date: Mar. 16, 2006

(65) Prior Publication Data
US 2008/0067855 A1    Mar. 20, 2008

(30) Foreign Application Priority Data
Sep. 4, 2004 (GB) .................................. 0419763.8

(51) Int. Cl.
*B60P 1/00* (2006.01)
(52) U.S. Cl. ......................... 298/1 V; 298/17 S
(58) Field of Classification Search .................. 298/1 V, 298/1 B, 17 S; 414/306, 415
See application file for complete search history.

(56) References Cited

U.S. PATENT DOCUMENTS
6,209,964 B1 * 4/2001 Pinto et al. ..................... 298/1 V FOREIGN PATENT DOCUMENTS
| DE | 826266 | 12/1951 |
|---|---|---|
| DE | 1934711 A | 7/1969 |
| DE | 1934711 | 2/1971 |
| DE | 3319074 | 11/1984 |
| DE | 3319074 A1 | 11/1984 |
| EP | 0855581 | 7/1998 |
| FR | 2790432 | 9/2000 |
| GB | 831633 A | 3/1960 |
| SU | 1117237 A1 | 10/1984 |
| SU | 1657423 A | 6/1991 |

OTHER PUBLICATIONS
International Search Report (European Patent Office).

* cited by examiner

*Primary Examiner* — Stephen Gordon
(74) *Attorney, Agent, or Firm* — Michael Best & Friedrich LLP

(57) ABSTRACT

A vehicle or trailer for transporting a load of, for example, fluent bulk material. The vehicle or trailer comprising a chassis (28) and a container mounted on said chassis (28). Said container comprises a base, a plurality of load retaining walls defining a volume for receipt of said load and a discharge opening. The container is mounted to the chassis by at least one connector (34, 35) that permits reciprocal translational movement of the container relative to the chassis (28) whilst mounted thereon between first and second positions so as to agitate the load and encourage it to flow out of the discharge opening. The at least one connector is arranged to permit translational movement of the container from the first position to the second position more slowly than from the second position to the first position. Provision of such an arrangement in which the load is discharged by reciprocal translational movement of the container relative to the chassis obviates or at least reduces the need to tip the container to discharge the load. Thus the risk of the container rolling over whilst the load is discharged is greatly reduced.

36 Claims, 24 Drawing Sheets

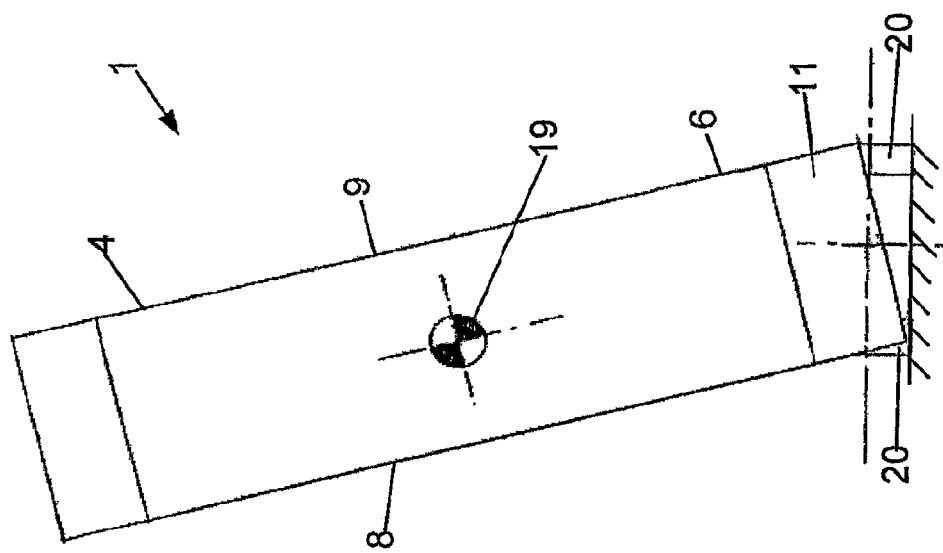
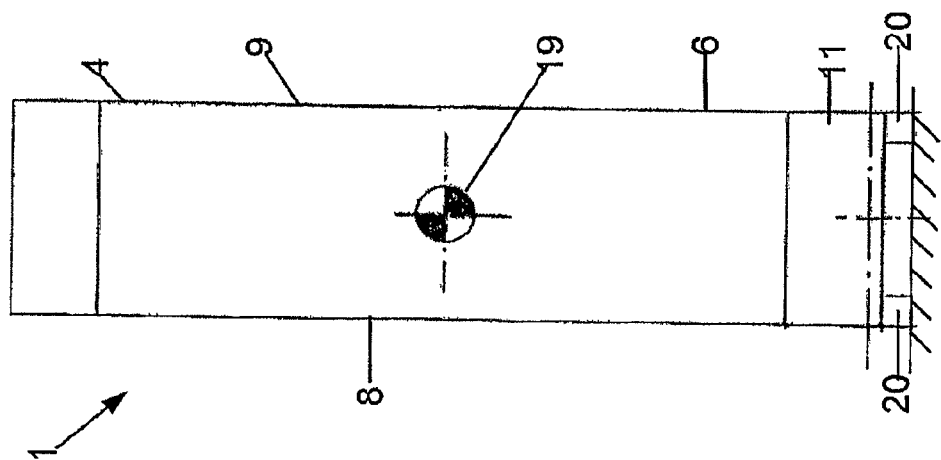

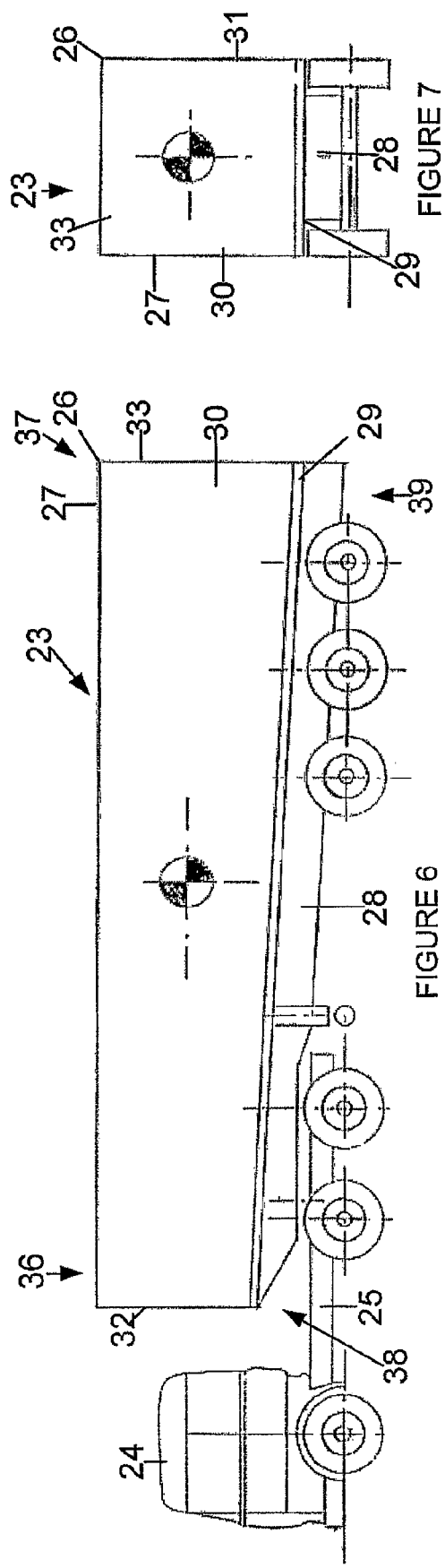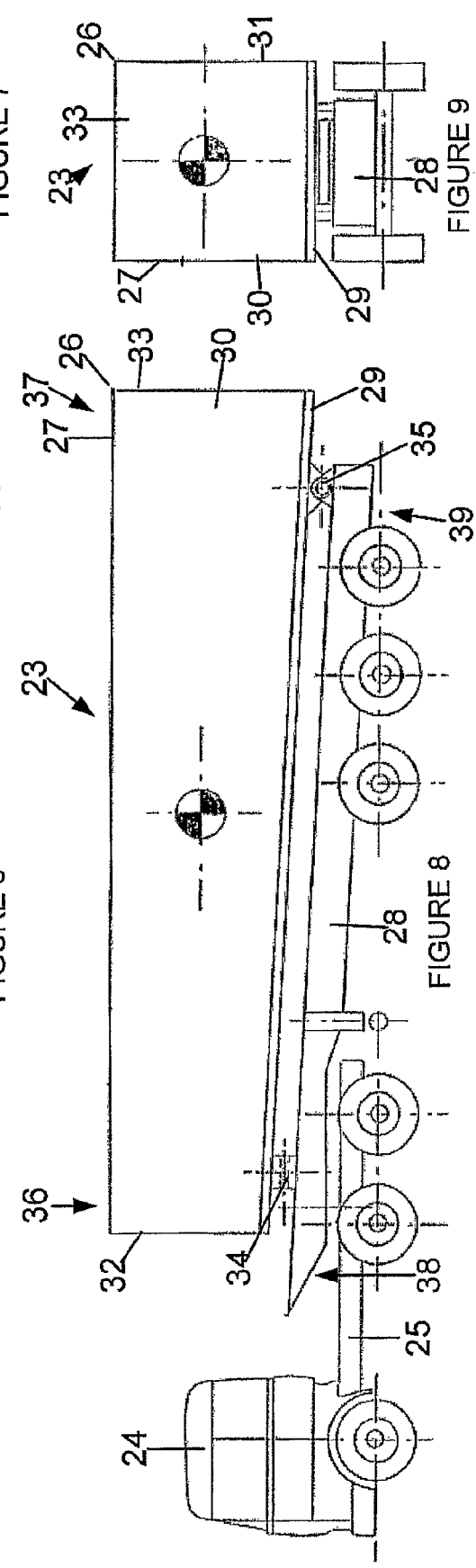

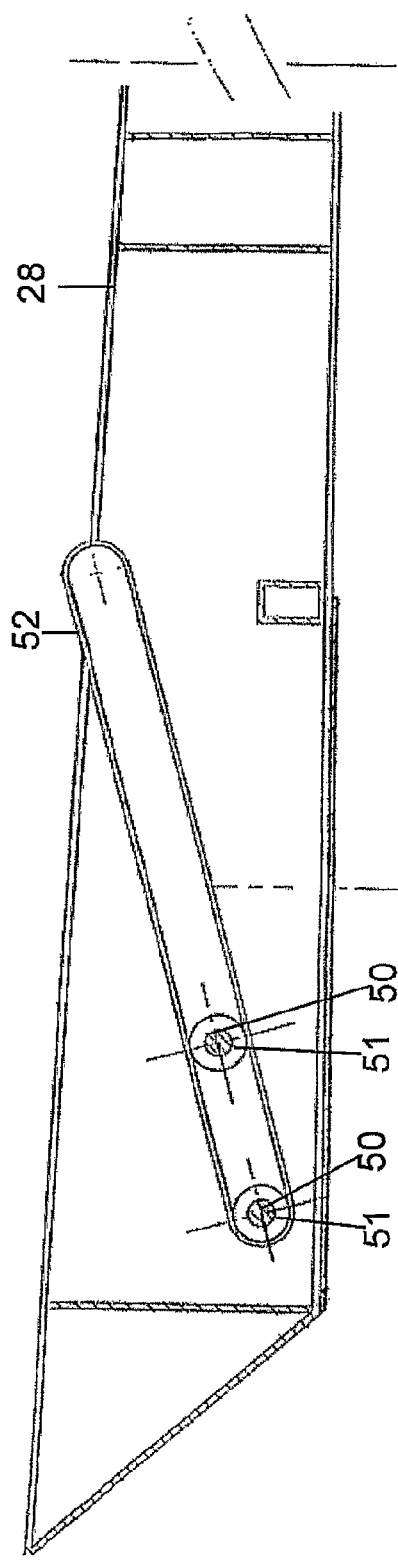
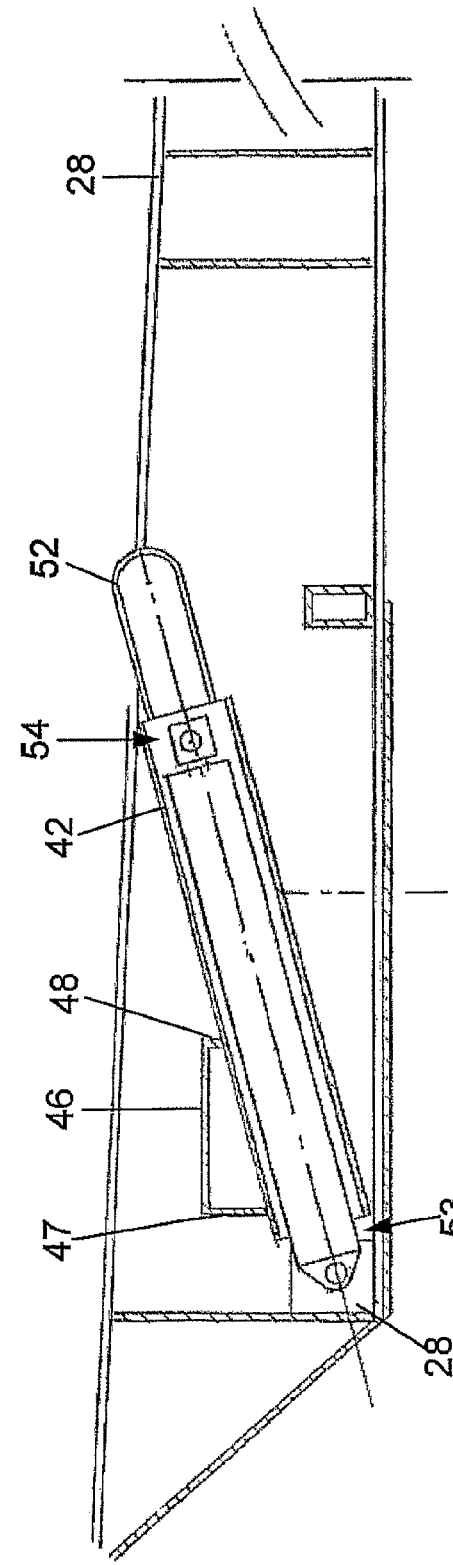

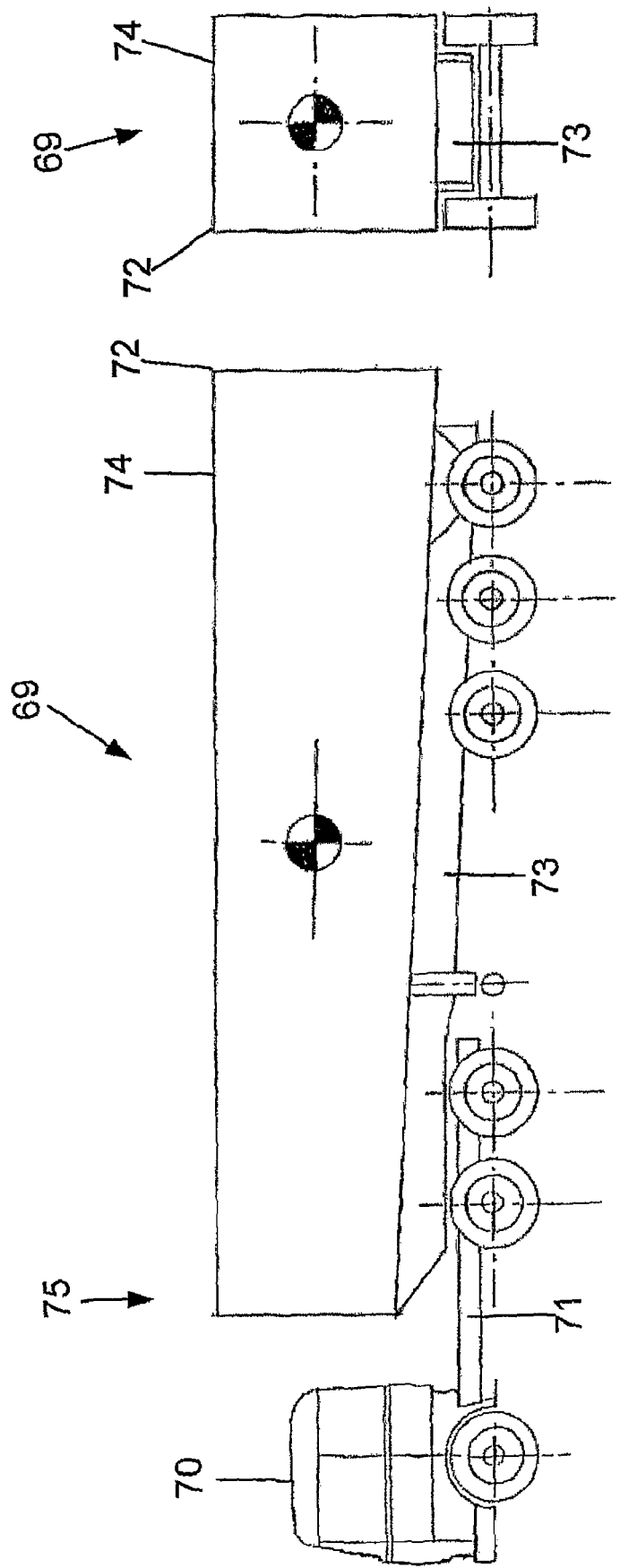

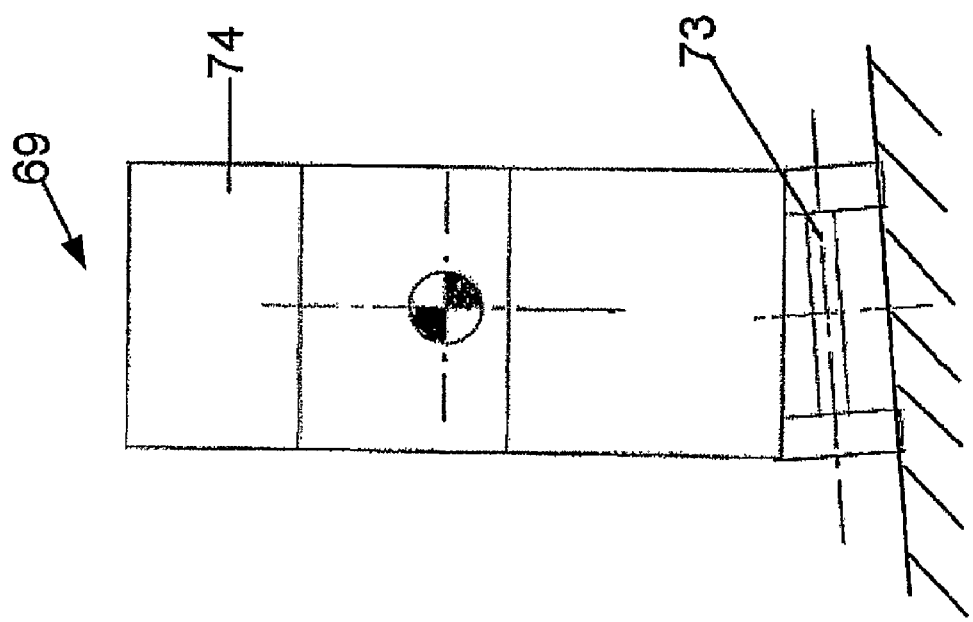

VEHICLE OR TRAILER

The present invention relates to a vehicle or trailer for transporting a load, particularly but not exclusively a load of fluent bulk material, such as sand, earth and the like.

Load carrying vehicles, such as articulated lorries and tankers, are often used to transport general freight loads comprised of, for example, fluent bulk material, such as sand, earth, powder etc. An example of an articulated lorry used to transport such a load is illustrated in FIGS. 1 to 5. Referring to FIGS. 1 and 2, the lorry 1 comprises a cab 2 mounted on a cab chassis 3 which is coupled via a kingpin (not shown) to a trailer 4 comprising a chassis 5 to which is mounted a container 6 having a base 7, first and second opposite side walls 8, 9, a fixed front end wall 10 and a hinged rear end wall 11. The walls 8, 9, 10, 11 and base 7 define a volume to house the fluent bulk material during transportation. The container 6 is mounted to the chassis 5 by front and rear mountings 12, 13 located adjacent to the front and rear ends 14, 15 of the container 6.

Referring now to FIGS. 3 to 5, when it is desired to discharge the load from the container 6 a telescopic arm 16, which connects the front end 17 of the chassis 5 to the front mounting 12, is extended to raise the front end 14 of the container 6 to a height of up to around 13 meters above the ground (depending on the length of the container 6, and the size and nature of the fluent bulk material) whilst the rear end 15 of the container 6 pivots via the rear mounting 13 about a shaft 18 fixed to the chassis 5. This action tips the container 6 to an angle α of up to approximately 70° relative to the chassis 5. As a result, the fluent bulk material flows under gravity from the rear end 15 of the container 6 via the hinged rear end wall 11.

During a tipping operation the centre of gravity 19 of the container 6 and the load can be as high as 6.5 meters above ground level. It is at this point when the trailer 4 is most susceptible to 'roll over'. Roll over refers to the situation where the trailer 4 is tipping and an event takes place that upsets the equilibrium of the trailer 4 and causes the centre of gravity 19 to move outside the trailer's 'pivotal point', which is located at the outside edge of the rear trailer tyres 20 of the lorry 1. Events which may cause roll over include the load sticking, a strong sidewind, mechanical failure, unequal tyre pressures or the ground giving way due to the uneven distribution of forces between the nearside and offside tyres 21, 22. When roll over occurs the trailer 4 falls sideways and is often damaged. Moreover, persons in the vicinity of the trailer 4 may also be harmed by the trailer rolling over. When the container 6 of the lorry 1 is raised to 70° it has been calculated that a sideways tilt of only 14° to the vertical will cause roll over to occur. In practice, a sideways tilt of 8 to 9° can cause a well designed and well maintained trailer to roll over. A poorly designed and/or poorly maintained trailer may be susceptible to roll over at sideways tilt angles of as low as 4 to 5°. The difference between the calculated and practical sideways tilt angles required to cause roll over is primarily due to the fact that the chassis of the trailer is inclined to flex. Additionally, the air suspension and tyres on the side of the trailer taking the extra load when the trailer is tilting undergo greater compression than those on the opposite side which further increases the risk of roll over occurring.

Roll over has become a progressively greater problem as legislation has permitted heavier vehicles to operate on public roads. For example, in the UK it is currently permitted to operate articulated lorries at 44 tonnes gross weight. As a result, current trailer bodies are now longer than before, which raises the centre of gravity of the trailer when in a tipping position and increases the risk of roll over occurring. Further factors which can increase the risk of trailers rolling over are the use of such trailers on uneven ground and trailers carrying loads in excess of their allotted capacity.

Problems associated with roll over are assuming greater importance within both the haulage industry and Health and Safety groups. Indeed, the UK Health and Safety Executive has recently expressed concern regarding the safety of conventional tipping trailers. There are therefore significant problems associated with the safety of conventional load carrying vehicles which employ a tipping trailer to discharge their load.

Several systems have been proposed to enable load carrying vehicles to be unloaded more safely. One such system employs an ejector system in which a heavy duty hydraulic ram connected to the front end of the trailer is fitted with a face plate which acts as a moving bulkhead. As the hydraulic ram extends the face plate moves from the front towards the rear of the trailer pushing the load out of the rear of the trailer. Unfortunately this system suffers from a number of disadvantages, for example, due to the size of the hydraulic ram and face plate required the load capacity of the trailer is reduced, and the system is expensive to set up and maintain. Another system uses a walking floor system. The floor of the trailer consists of a plurality of sets of longitudinal planks which support the load during transportation. Movement of each set of planks moves the load around 300 mm towards the rear of the trailer. Once a set of planks has moved towards the rear of the trailer each plank returns separately to its original position nearer the front of the trailer leaving the load towards the rear of the trailer. This system is not satisfactory because it is again costly to set up and maintain, and is only suitable for use with loads which can be placed inside the trailer gently because the system is rendered inoperable if any of the planks are damaged or become misaligned. A further system employs a belt drive system fitted to the base of the trailer. Many different versions of this system have been tested. One version uses a bulkhead fixed to the belt which is operated to move the bulkhead towards the rear of the trailer to push the load out of the rear of the trailer. This system suffers from problems relating to sealing the moving belt to the sides of the trailer and has been adopted primarily for agricultural applications.

An object of the present invention is to obviate or mitigate the aforementioned problems and to provide a system which permits the safe and effective unloading of load carrying vehicles.

According to a first aspect of the present invention there is provided a vehicle or trailer for transporting a load of fluent bulk material, comprising a chassis and a container mounted on said chassis, said container comprising a base, a plurality of load retaining walls defining a volume for receipt of said load and a discharge opening, the container being mounted to the chassis by at least one connector that permits reciprocal translational movement of the container relative to the chassis whilst mounted thereon between first and second positions so as to agitate the load and encourage it to flow out of the discharge opening, wherein the at least one connector is arranged to permit translational movement of the container from the first position to the second position more slowly than translational movement of the container from the second position to the first position.

A related aspect of the present invention provides a method of discharging a load from a vehicle or trailer comprised of a chassis and a container mounted on said chassis, said container comprising a base, a plurality of load retaining walls defining a volume for receipt of said load and a discharge opening, the container being mounted to the chassis by at least one connector, the method comprised of causing reciprocal translational movement of the container relative to the chassis whilst mounted thereon between first and second positions so as to agitate the load and encourage it to flow out of the discharge opening, wherein translational movement of the container from the first position to the second position occurs more slowly than translational movement of the container from the second position to the first position.

Provision of such an arrangement in which the load is discharged by reciprocal translational movement of the container relative to the chassis obviates or at least reduces the need to tip the container to discharge the load. Thus the risk of the container rolling over whilst the load is discharged is greatly reduced.

In a preferred embodiment of the above aspects of the present invention said at least one connector permits reciprocal substantially vertical movement in combination with said translational movement of the container relative to the chassis.

Another aspect of the present invention provides a vehicle or trailer for transporting a load of fluent bulk material, comprising a chassis and a container mounted on said chassis, said container comprising a base, a plurality of load retaining walls defining a volume for receipt of said load and a discharge opening, the container being mounted to the chassis by at least one connector that permits reciprocal translational movement of the container relative to the chassis whilst mounted thereon between first and second positions so as to agitate the load and encourage it to flow out of the discharge opening, wherein said at least one connector permits reciprocal substantially vertical movement in combination with said translational movement of the container relative to the chassis.

An aspect of the present invention related to the above vehicle or trailer provides a method of discharging a load from a vehicle or trailer comprised of a chassis and a container mounted on said chassis, said container comprising a base, a plurality of load retaining walls defining a volume for receipt of said load and a discharge opening, the container being mounted to the chassis by at least one connector, the method comprised of causing reciprocal translational movement of the container relative to the chassis whilst mounted thereon between first and second positions so as to agitate the load and encourage it to flow out of the discharge opening, wherein said container undergoes reciprocal substantially vertical movement in combination with said translational movement relative to the chassis.

In the above aspects of the present invention where the at least one connector permits the container to undergo combined reciprocal substantially vertical and translational movement, it is preferred that the at least one connector is arranged to permit translational movement of the container from the first position to the second position more slowly than translational movement of the container from the second position to the first position.

A further aspect of the present invention provides a vehicle or trailer for transporting a load of fluent bulk material, comprising a chassis and a container mounted on said chassis, said container comprising a base, a plurality of load retaining walls defining a volume for receipt of said load and a discharge opening, the container being mounted to the chassis by at least one connector that permits reciprocal translational movement of the container relative to the chassis whilst mounted thereon between first and second positions so as to agitate the load and encourage it to flow out of the discharge opening, wherein the at least one connector permits said reciprocal translational movement of the container along an axis which is transverse to a longitudinal axis of the chassis.

An aspect of the present invention related to the above defined aspect provides a method of discharging a load from a vehicle or trailer comprised of a chassis and a container mounted on said chassis, said container comprising a base, a plurality of load retaining walls defining a volume for receipt of said load and a discharge opening, the container being mounted to the chassis by at least one connector, the method comprised of causing reciprocal translational movement of the container relative to the chassis whilst mounted thereon between first and second positions so as to agitate the load and encourage it to flow out of the discharge opening, wherein said container undergoes reciprocal translational movement along an axis which is transverse to a longitudinal axis of the chassis.

In the above aspects of the present invention where the at least one connector permits said reciprocal translational movement of the container along an axis which is transverse to a longitudinal axis of the chassis, it is preferred that the at least one connector is arranged to permit translational movement of the container from the first position to the second position more slowly than translational movement of the container from the second position to the first position. Moreover, said at least one connector may permit reciprocal substantially vertical movement in combination with said translational movement of the container relative to the chassis.

Furthermore, in the above aspects of the present invention which relate to discharging a load of fluent bulk material from the container via the discharge opening it is preferred that translational movement of the container from the first position to the second position displaces the container towards the part of the vehicle or trailer from which the load is to be discharged via the discharge opening. For example, if the discharge opening is provided at the rear of the vehicle, it is preferred that translational movement of the container from the first position to the second position displaces the container towards the rear of the vehicle, i.e. the container undergoes a rearwards movement. In this case, movement of the container from the second position back to the first position would be a forward movement displacing the container towards the front of the vehicle. Preferably the first position is distal to the part of the vehicle or trailer from which the load is to be discharged via the discharge opening and the second position is proximal to the part of the vehicle or trailer from which the load is to be discharged via the discharge opening.

A still further aspect of the present invention provides a vehicle or trailer for transporting a load, comprising a chassis and a container mounted on said chassis, said container comprising a base, a plurality of load retaining walls defining a volume for receipt of said load and an entrance to said volume, the container being mounted to the chassis by at least one connector that permits reciprocal translational movement of the container relative to the chassis whilst mounted thereon between first and second positions so as to agitate the load and encourage it to move away from the entrance.

A still further related aspect of the present invention provides a method of positioning a load on a vehicle or trailer comprised of a chassis and a container mounted on said chassis, said container comprising a base, a plurality of load retaining walls defining a volume for receipt of said load and an entrance to said volume, the container being mounted to the chassis by at least one connector, the method comprised of causing reciprocal translational movement of the container relative to the chassis whilst mounted thereon between first and second positions so as to agitate the load and encourage it to move away from the entrance.

In the above two aspects of the present invention where reciprocal movement of the container causes the load to move away from the entrance to the container volume, it is preferred that the at least one connector is arranged to permit translational movement of the container from the first position to the second position more slowly than translational movement of the container from the second position to the first position. Moreover, said at least one connector may permit reciprocal substantially vertical movement in combination with said translational movement of the container relative to the chassis.

In the aspects of the present invention where the load is caused to move away from the entrance, it is preferred that translational movement of the container from the first position to the second position displaces the container away from the part of the vehicle or trailer from which the load is placed in to the container via the container entrance. For example, if the entrance is provided at the rear of the container such that the load would be place in to the container from the rear of the vehicle, it is preferred that translational movement of the container from the first position to the second position displaces the container away from the rear of the vehicle, i.e. the container undergoes a forward movement. In this case, movement of the container from the second position back to the first position would be a rearward movement displacing the container towards the rear of the vehicle.

Preferably said load retaining walls comprise side and end walls and one of said side or end walls is hingedly mounted so as to be openable to provide said discharge opening or container entrance. It is preferred that said discharge opening or entrance is defined by one of said side or end walls. The discharge opening is typically defined by one of the side or end walls of the container when the load-carrying vehicle is a tanker. Such a tanker may incorporate pneumatic means for assisting the flow of the load from the container via the discharge opening.

In certain aspects of the present invention set out above the at least one connector permits translational movement of the container from the first position to the second position more slowly than translational movement of the container from the second position to the first position, in the other aspects of the present invention the connector may be arranged to permit translational movement of the container between the first and second positions at the same speed or at different speeds. In a preferred embodiment of these aspects of the present invention the connector is arranged to permit translational movement of the container from the first position to the second position more slowly than translational movement of the container from the second position to the first position.

Said at least one connector preferably comprises a mounting connected to displacement means to provide said translational movement.

Preferably said vehicle or trailer further comprises tipping means to tip said container about a pivot connected to said mounting. It is preferred that said pivot defines a pivot axis transverse to the longitudinal axis of the container.

In a preferred embodiment of the present invention said mounting is attached to said container and said displacement means is attached to said chassis. The displacement means may comprise one or more hydraulic ram or air spring. Preferably an end of the displacement means is connected to the chassis and an opposite end of the displacement means is connected to the mounting. It is preferred that an end of the displacement means is connected to the chassis and an opposite end of the displacement means is connected to a rotatable arm which is connected to the mounting.

Preferably the displacement means is connected to a projection which is received in a channel defined by the chassis. Said channel may extend in a direction which is substantially parallel to the direction of translational movement of the container. The channel is preferably inclined with respect to the plane of the chassis of the vehicle or trailer. The angle of inclination is preferably such that a distal end of the channel relative to the discharge opening is lower than the opposite proximal end. It is therefore preferred that the channel is upwardly inclined towards the discharge opening. The channel may be upwardly inclined in the direction of movement of the container from first position to the second position such that, upon movement of the container from the first position to the second position the container is raised and upon movement of the container from the second position back to the first position the container is lowered. Said projection preferably comprises a stub shaft supporting a rotatable wheel.

The displacement means may comprise first displacement means to move said container from the first position to the second position and second displacement means to displace said container from the second position to the first position. In a preferred embodiment at least one of the first and second displacement means comprises one or more hydraulic ram or air spring. Preferably the first displacement means comprises a pair of hydraulic rams and the second displacement means comprises a pair of air springs. Said pair of air springs may be located inboard of said pair of hydraulic rams.

Where the at least one connector permits reciprocal substantially vertical movement in combination with said translational movement of the container relative to the chassis it is preferred that said combination of substantially vertical movement with said translational movement causes said container to follow a generally arcuate path. In an alternative preferred embodiment said at least one connector permits only rectilinear translational movement of the container relative to the chassis. Preferably the at least one connector permits said reciprocal translational movement of the container along an axis which is substantially parallel to a longitudinal axis of the chassis. Alternatively, the at least one connector permits said reciprocal translational movement of the container along an axis which is transverse, preferably substantially perpendicular, to a longitudinal axis of the chassis.

Said chassis is preferably supported on wheels mounted on at least one axle connected to said chassis. Moreover, said at least one axle may be connected to the chassis by a suspension system which is connected to suspension levelling means to monitor the angular offset of the at least one axle from the horizontal and control said suspension system so as to minimise the angular offset of the container from the horizontal. Additionally, weight monitoring means may be provided comprising an electronic sensor to detect the force required to initiate translational movement of the container initially from the first position to the second position and processing means to calculate the weight of the load held in the container from the magnitude of said force.

An embodiment of the present invention will now be described, by way of example only, with reference to the accompanying drawings in which:

FIG. 4 is a schematic end view of the lorry of FIG. 3;

FIG. 5 is a schematic end view of the lorry of FIG. 3 undergoing sideways tilting of the trailer;

FIG. 6 is a schematic side view of an articulated lorry incorporating a trailer according to an aspect of the present invention shown with the container in a forward position with respect to the chassis;

FIG. 7 is a schematic end view of the lorry of FIG. 6;

FIG. 8 is a schematic side view of the articulated lorry of FIG. 6 shown with the container in a rearward position with respect to the chassis;

FIG. 9 is a schematic end view of the lorry of FIG. 8;

FIG. 14 is a schematic view along B-B of FIG. 12;

FIG. 15 is a schematic view along C-C of FIG. 12;

FIG. 22 is a schematic side view of an alternative articulated lorry incorporating a trailer according to an aspect of the present invention shown with the container in a position suitable for on-road use;

FIG. 23 is a schematic end view of the lorry of FIG. 22;

FIG. 28 is a schematic end view of the lorry of FIG. 25 on an inclined surface which produces an axle slope of 5°;

Figures 1, 2:
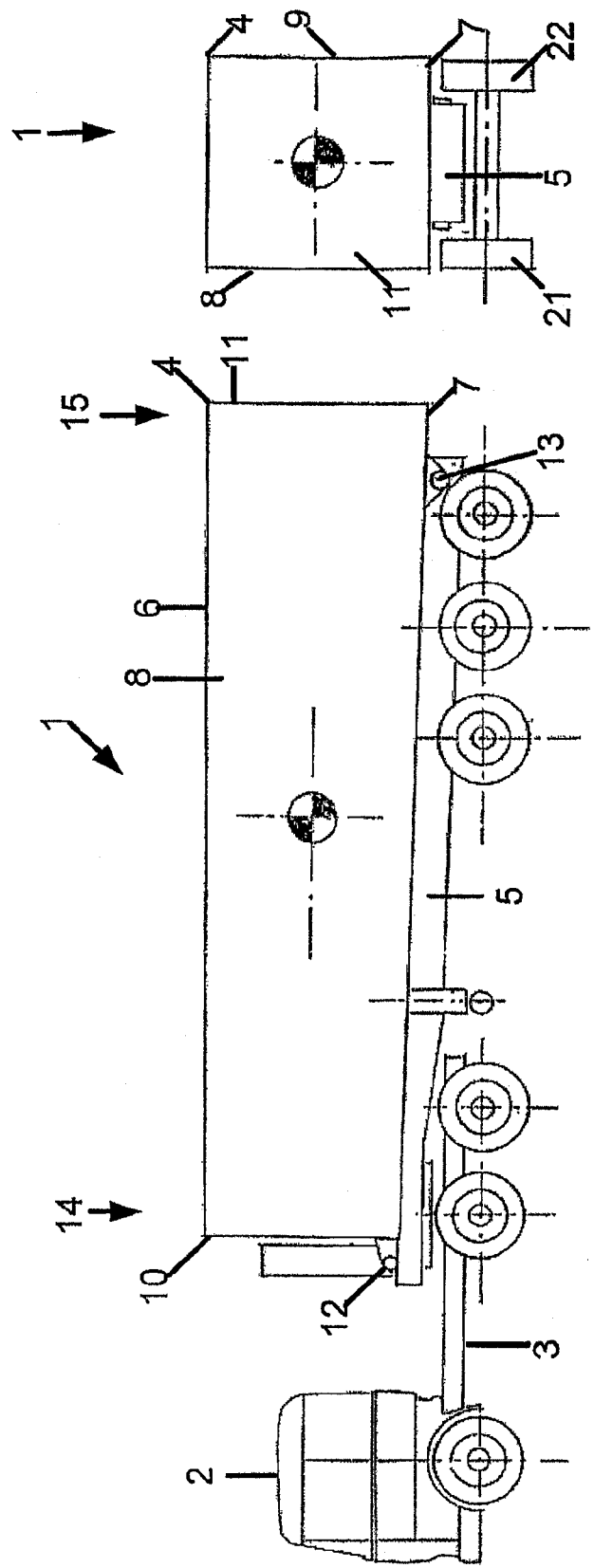
FIG. 1 is a schematic side view of an articulated lorry incorporating a conventional tipping trailer in a configuration suitable for on-road use.
FIG. 2 is a schematic end view of the lorry of FIG. 1.
Figure 3:
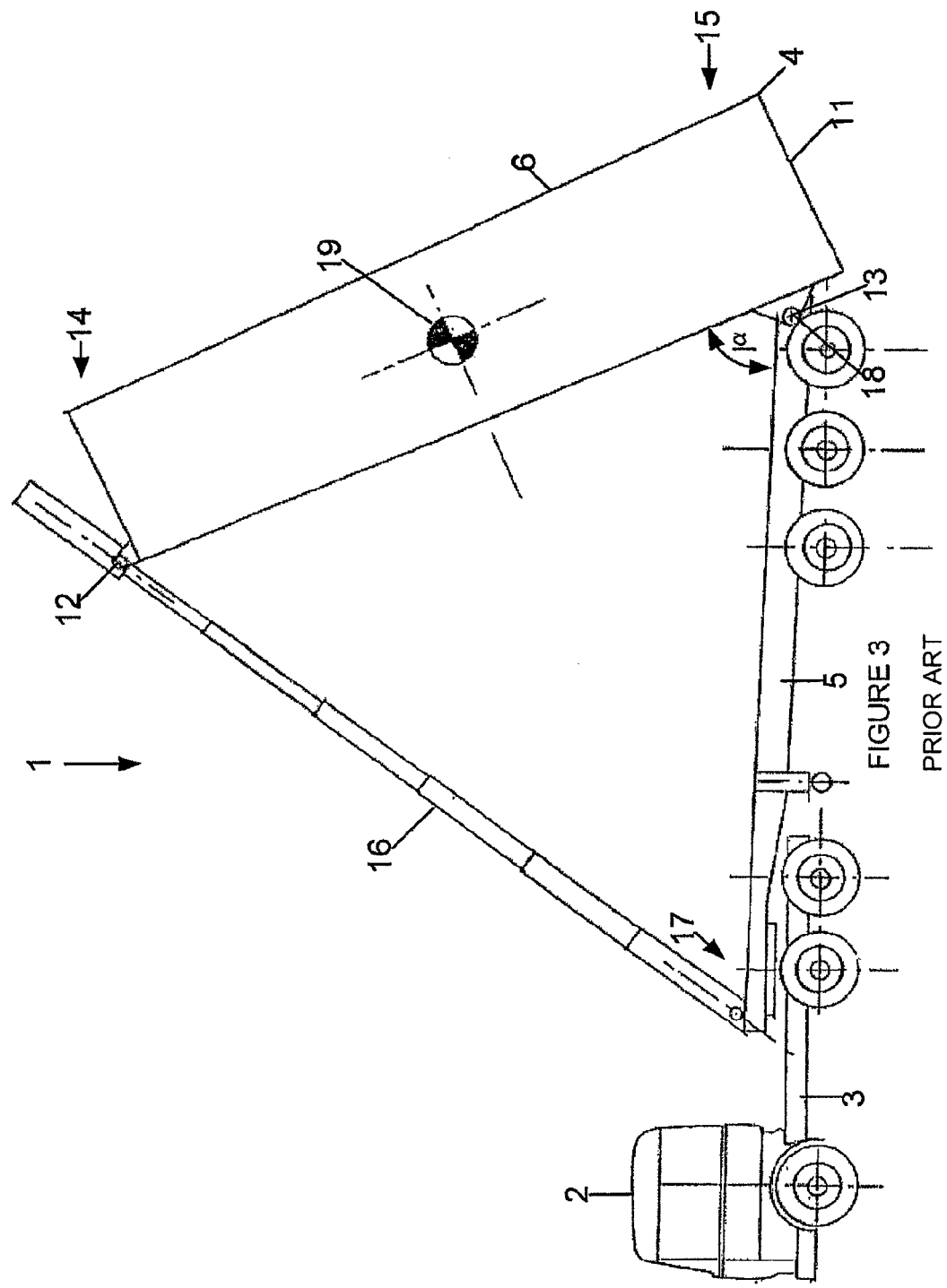
FIG. 3 is a schematic side view of the lorry of FIG. 1 in a tipping configuration suitable to discharge a load from the rear of the lorry.

FIGS. 6 to 9 illustrate an articulated lorry 23 which consists of a conventional cab 24 mounted on a conventional cab chassis 25 which is coupled to a trailer 26 comprising a load carrying container 27 mounted to a trailer chassis 28. The container 27 has a base 29, first and second opposite side walls 30, 31, a fixed front end wall 32 and a hinged rear end wall 33. The walls 30, 31, 32, 33 and base 29 define a volume which is designed to house a load, e.g. a load of fluent bulk material (not shown), such as sand, during transportation. The container 27 is mounted to the chassis 28 by front and rear mountings 34, 35 (visible in FIGS. 8 and 9) located adjacent the front and rear ends 36, 37 of the container 27. The chassis 28 is inclined to provide an angle of approximately 2 to 4° between front and rear ends 38, 39 of the chassis 28 and thus provide a similar angle between the front and rear ends 36, 37 of the container 27.

In FIGS. 6 and 7 the container 27 is in a forward position in which the front and rear ends 36, 37 of the container 27 are generally in line with the front and rear ends 38, 39 of the chassis 28. In FIGS. 8 and 9 the container 27 is in a rearward position in which the front and rear ends 36, 37 of the container 27 are rearwardly offset with respect to the front and rear ends 38, 39 of the chassis 28. The front and rear mountings 34, 35 are visible in FIGS. 8 and 9 but not FIGS. 6 and 7 because as the container 27 is moved from the forward position (FIG. 6) to the rearward position (FIG. 8) it is also displaced upwards relative to the chassis 28 which enables the mountings 34, 35 to be seen. The means by which this is achieved is described in greater detail in relation to FIGS. 11 to 21.

To discharge a load (not shown) from the container 27 an operator actuates displacement means (described in more detail below) which causes the container 27 to be reciprocally displaced between forward and rearward positions. Although the length and speed of displacement between the forward and rearward positions can be controlled to suit a particular application, in this specific embodiment the displacement means is configured such that rearwards translation of the container 27 is significantly slower than forwards translation of the container 27. Thus the container 27 moves rearwards relatively slowly along the longitudinal axis of the chassis 28 and then forwards more quickly along the longitudinal axis of the chassis 28 in a reciprocating manner. This movement agitates the load of a fluent bulk material (not shown) and causes it to be urged towards the rear end 37 of the container 27 where it is discharged through a discharge opening formed by opening of the hinged rear end wall 33 of the container 27 as in conventional trailers of this type. In this specific embodiment the container 27 undergoes reciprocal displacement along the longitudinal axis of the chassis 28, which is a preferred embodiment of the present invention. However, it is envisaged that the container may be connected to the chassis in such a way that the container is reciprocally displaced along an axis which is transverse (e.g. perpendicular) to the longitudinal axis of the chassis.

Figure 10:
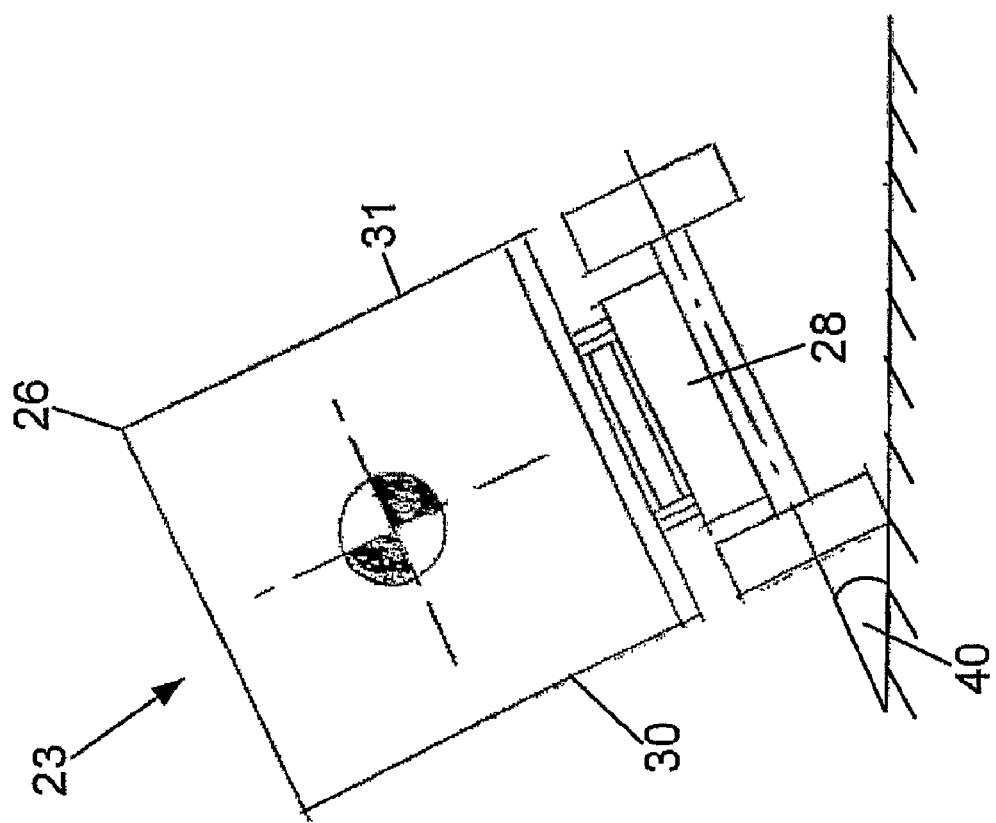
FIG. 10 is a schematic end view of the lorry of FIG. 9 undergoing sideways tilting of the trailer.

A significant advantage provided by the present invention is that the front end 36 of the container 27 does not have to be raised relative to the rear end 37 of the container 27 to tip the container 27 to discharge the load. By obviating the need to tip the container 27 problems relating to roll over are significantly reduced. This is exemplified in FIG. 10 which depicts the inventive lorry 23 with the container 27 in the rearward position as shown in FIGS. 8 and 9 when undergoing a sideways tilt angle 40 of 28° to the ground, which is the maximum calculated tilt angle which the inventive lorry 23 can withstand prior to rolling over. The inventive lorry 23 can therefore be subjected to twice the sideways tilt angle compared to a conventional 44 tonne maximum gross weight articulated lorry before roll over will occur.

Figure 11:
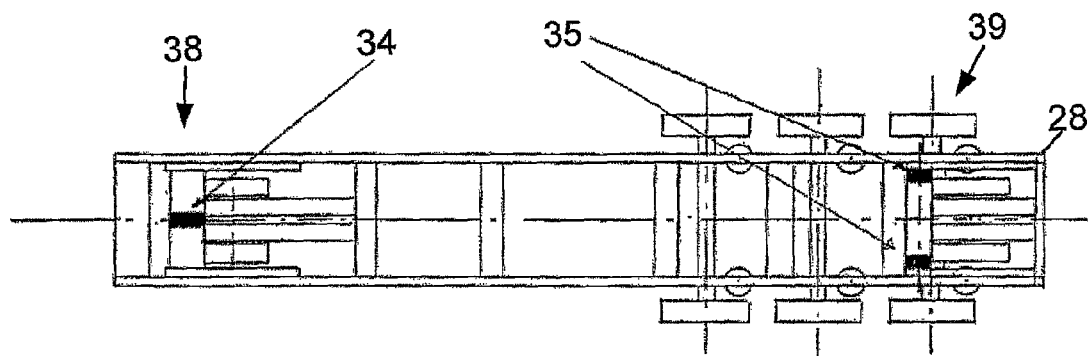
FIG. 11 is a schematic plan view of the trailer of the lorry of FIG. 6 with the container removed.
Figure 13:
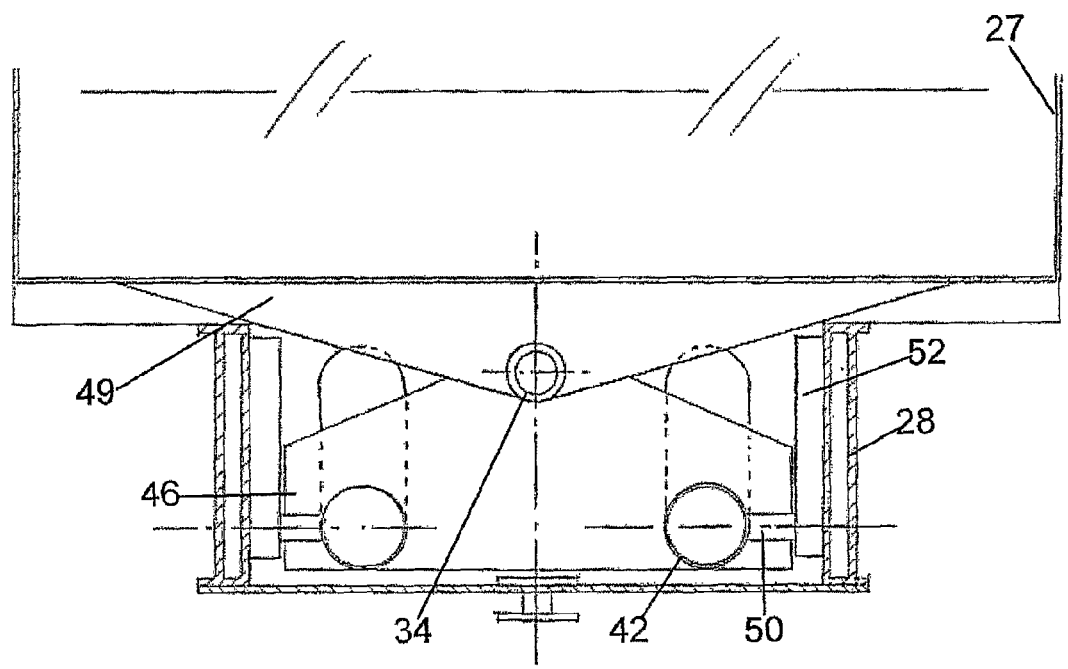
FIG. 13 is a schematic view along A-A of FIG. 12.

The means by which displacement of the container 27 relative to the chassis 28 is controlled will now be described in more detail. FIG. 11 illustrates in schematic form the chassis 28 and the front and rear mountings 34, 35 to which the container 27 (not shown in FIG. 11) is connected. One mounting 34 is located towards the front end 38 of the chassis 28 and a pair of mountings 35 are located towards the rear end 39 of the chassis 28. It will be appreciated that this relates to one embodiment of the present invention and that an alternative embodiment may employ any number and arrangement of front and rear mountings, e.g. a pair of mountings may be located towards the front end of the chassis and a single mounting may be located towards the rear of the chassis.

FIGS. 12 to 16 show in more detail a portion of the chassis 28 adjacent the front mounting 34. The front mounting 34 is connected to displacement means which comprises a pair of inclined air springs 41 provided inboard of a pair of hydraulic rams (not shown) located in inclined tubes 42. The air springs 41 are connected at their rear ends 43 to a plate 44 attached to the chassis 28 and at their front ends 45 to a support member 46 (comprising connected front and rear plates 47, 48) which is pivotally connected via front mounting 34 to a plate 49 depending from the base 29 of the container 27 (not shown on FIG. 12). Support member 46 is also connected to pairs of spaced stud shafts 50, ends of which carry wheels 51 (shown in FIG. 14) which are received in inclined channels 52 defined in the chassis 28. With reference to FIGS. 14 and 15, the exterior surfaces of the tubes 42 which house the hydraulic rams are connected to support member 46 and to the shafts 50. One end 53 of each hydraulic ram is connected to the chassis 28 and the opposite end 54 of each hydraulic ram is connected to the tube 42 within which the ram is housed. The exterior surface of each tube 42 is connected to the support member 46 which is pivotally connected to the container 27 via front mounting 34 and plate 47.

When it is desired to displace the container 27 rearwardly the hydraulic rams extend slowly and carry the tubes 42 rearwardly. Since the tubes 42 are connected to the container 27 via support member 46, plate 47 and front mounting 34, rearward displacement of the tubes 42 along an upwardly inclined path causes similar displacement of the container 27. Displacement of the tubes 42 along the inclined path is supported by virtue of the exterior surface of each tube 42 being connected, via shafts 50, to the wheels 51 which are constrained to move along the inclined channels 52. To displace the container 27 forwardly the air springs 41 are actuated to force rapidly the support member 46, plate 47, front mounting 34 and thereby container 27 forwardly along a downwardly inclined path. Controlled forward displacement of the container along a downwardly inclined path is again supported by support member 46 being connected, via shafts 50, to the wheels 51 which move along inclined channels 52. To enable the trailer to function in accordance with the present invention the hydraulic rams and air springs are operated via suitable operating means (not shown) to cause reciprocal forward and rearward displacement of the container 27 with respect to the chassis 28.

Figure 19:
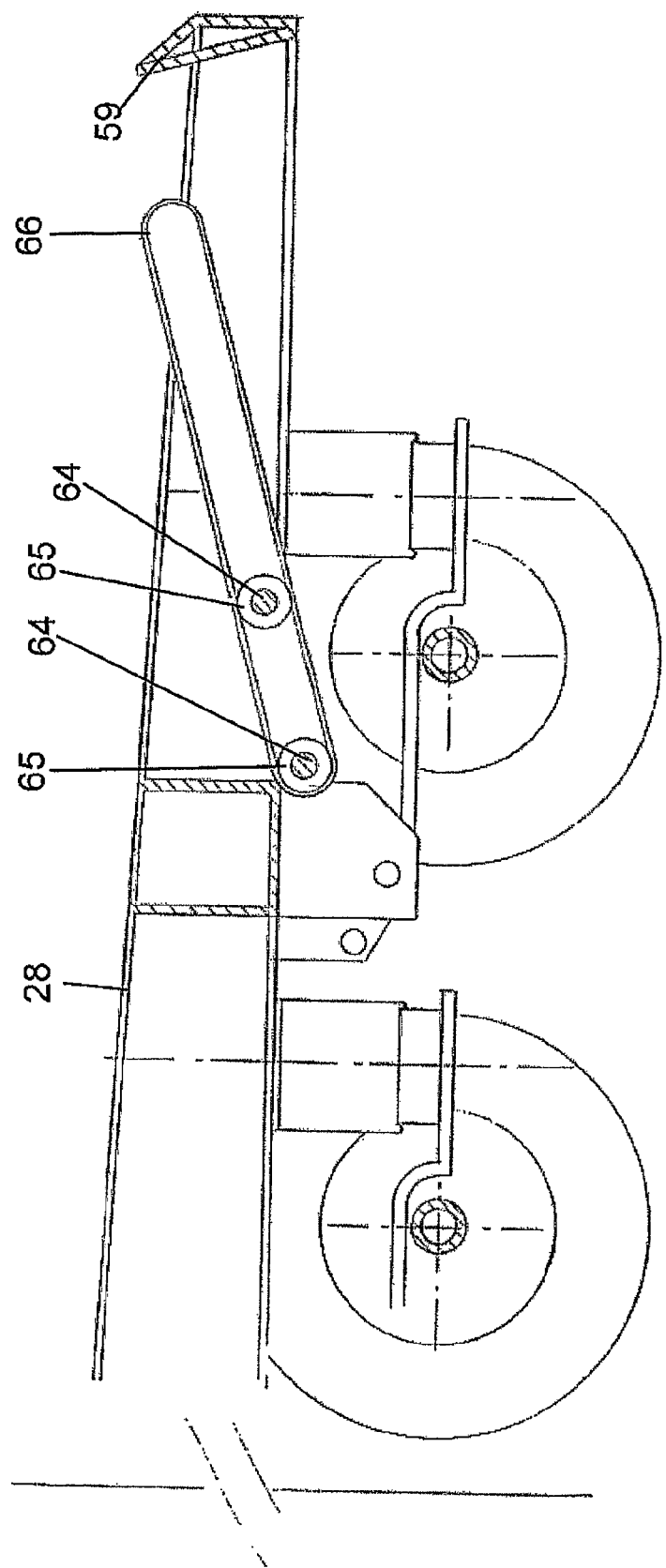
FIG. 19 is a schematic view along H-H of FIG. 17.
Figure 20:
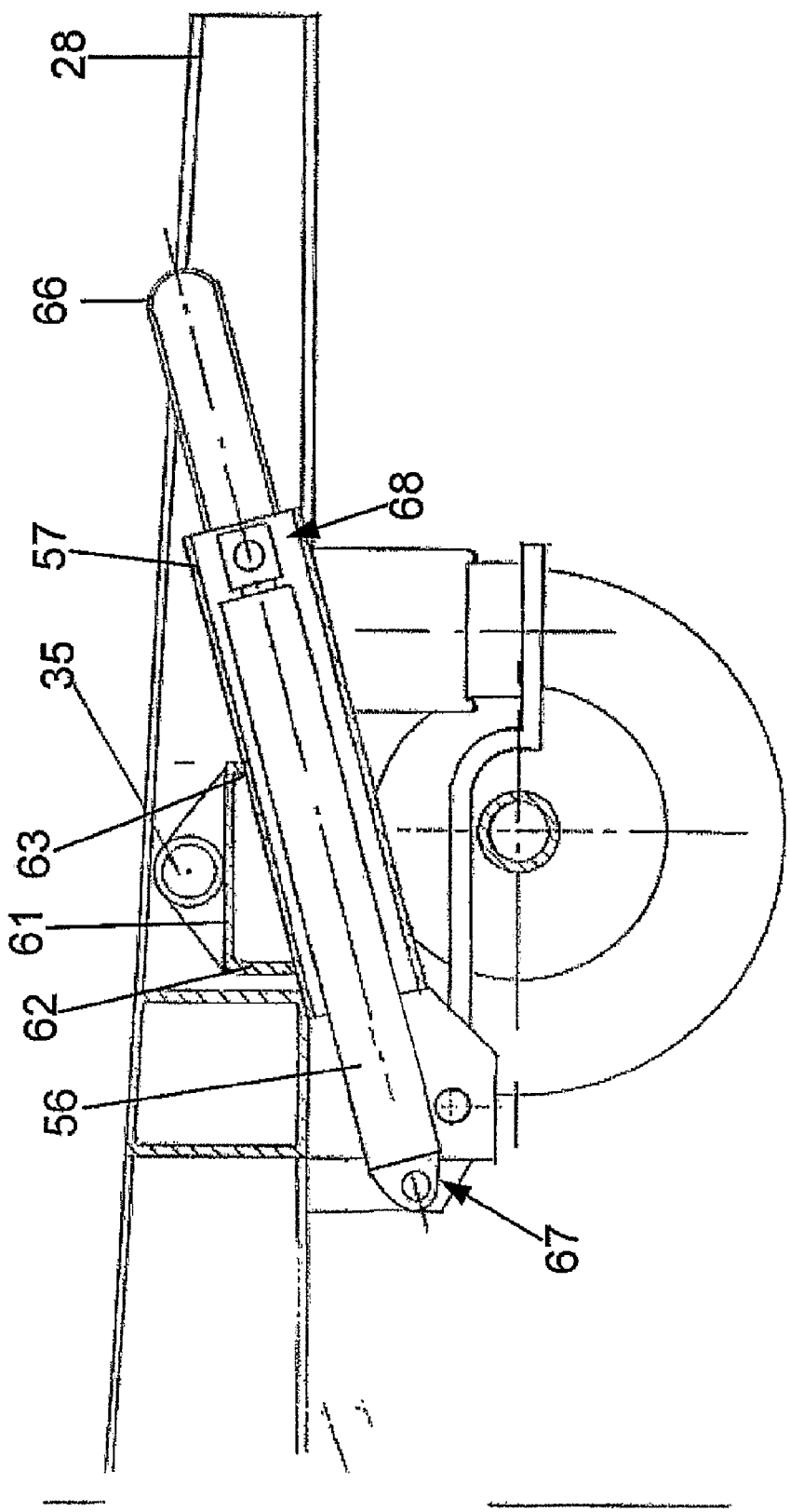
FIG. 20 is a schematic view along F-F of FIG. 17.
Figure 21:
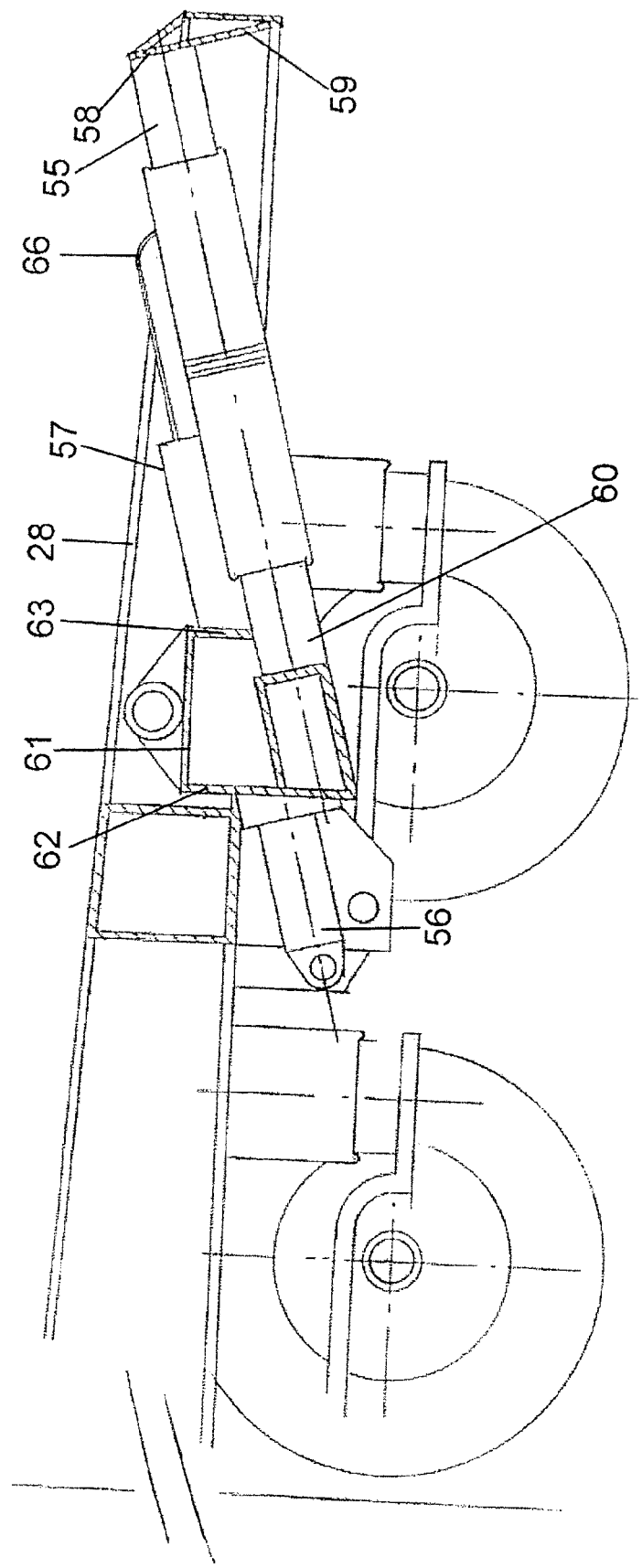
FIG. 21 is a schematic view along G-G of FIG. 17.

FIGS. 17 to 21 shows in more detail a portion of the chassis 28 adjacent the rear mountings 35. The rear mountings 35 are connected to similar displacement means to those connected to the front mounting 34. Thus, a pair of inclined air springs 55 are provided inboard of a pair of hydraulic rams 56 (shown in FIGS. 20 and 21) located in inclined tubes 57 are used to displace the container 27 forwardly and rearwardly with respect to the chassis 28 respectively. The air springs 55 are connected at their rear ends 58 to a plate 59 (shown most clearly in FIG. 21) attached to the chassis 28 and at their front ends 60 to a support member 61 (comprising connected front and rear plates 62, 63) which is pivotally connected to the container 27 via the rear mountings 35 which are located at either end of the support member 61 at either side of the lorry 23. Support member 61 is also connected to pairs of spaced stud shafts 64, ends of which carry wheels 65 (shown in FIG. 19) which are received in inclined channels 66 defined in the chassis 28. With reference to FIGS. 19 and 20, the exterior surfaces of the tubes 57 which house the hydraulic rams 56 are connected to the support member 61 and to the shafts 64. One end 67 of each hydraulic ram 56 is connected to the chassis 28 and the opposite end 68 of each hydraulic ram 56 is connected to the tube 57 within which the ram 56 is housed. The exterior surface of each tube 57 is connected to the support member 61 which is pivotally connected to the container 27 via rear mounting 35.

Operation of the air springs 55 and hydraulic rams 56 to displace the container 27 via the rear mountings 35 is synchronised with operation of the air springs 41 and hydraulic rams (not shown) used to displace the container 27 via the front mounting 34 to ensure that the front and rear ends 36, 37 of the container 27 move in unison. Thus, slow extension of the hydraulic rams 56 within inclined tubes 57 causes support member 61 to be displaced rearwardly along an upwardly inclined path carrying with it the rear end 37 of the container 27 via rear mountings 35. The air springs 55 are then actuated to quickly force support member 61 forwardly and downwardly along the same inclined path. The range and direction of motion of the wheels 65 within the inclined channels 66 positioned adjacent the rear mountings 35 is the same as that of wheels 51 within channels 52 positioned adjacent the front mounting 34 to ensure that the front and rear mountings 34, 35 are displaced in the same direction and over the same distance during use. However, it will be evident to the skilled person that any desirable range and/or direction of motion of the wheels (or any other component controlling movement of the container relative to the chassis) may be selected to suit a particular application.

A second embodiment of the present invention is presented in FIGS. 22 to 28. FIGS. 22 and 23 show a lorry 69 configured for road use which consists of a conventional cab 70 mounted on a conventional cab chassis 71 which is coupled to a trailer 72. The trailer 72 comprises a chassis 73 to which is connected a container 74. This embodiment has been devised for situations where discharging of a load (not shown) by reciprocal motion of the container 74 can be aided by tipping the container 74 to an angle of around 20° to the ground in an analogous fashion to a conventional tipping trailer, i.e. by raising a front end 75 of the container 74 above the chassis 73. An important difference between this embodiment of the present invention and a conventional tipping trailer is that the angle to which the container 74 must be raised to discharge any given load is significantly less than that of a conventional trailer. This is because the container 74 is reciprocally displaced forwardly and rearwardly in a similar manner to that described in relation to the first embodiment of the invention while the front end 75 of the container 74 is in a raised position.

Figure 24:
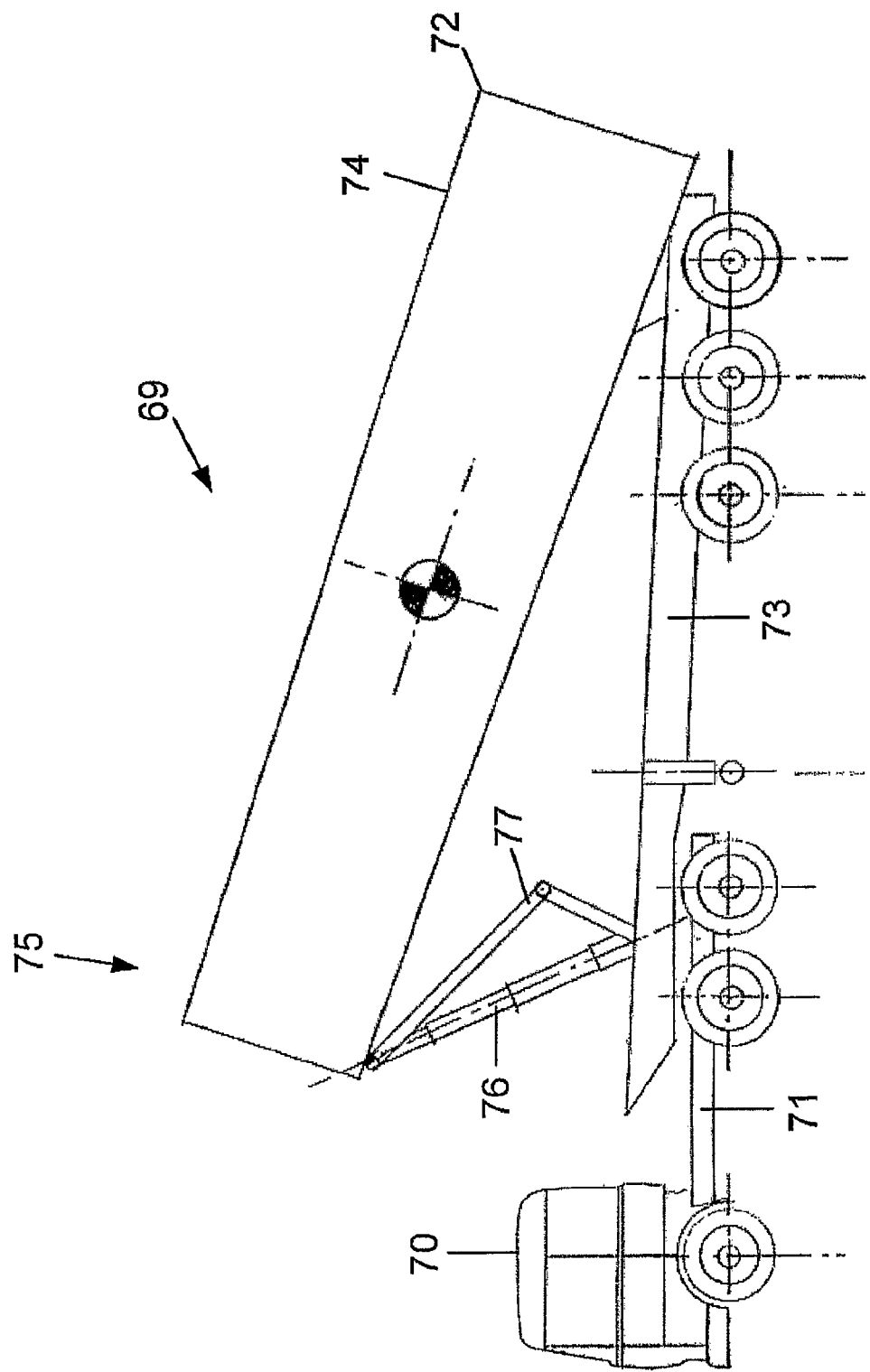
FIG. 24 is a schematic side view of the lorry of FIG. 22 with the container in a forward tipping position.
Figure 25:
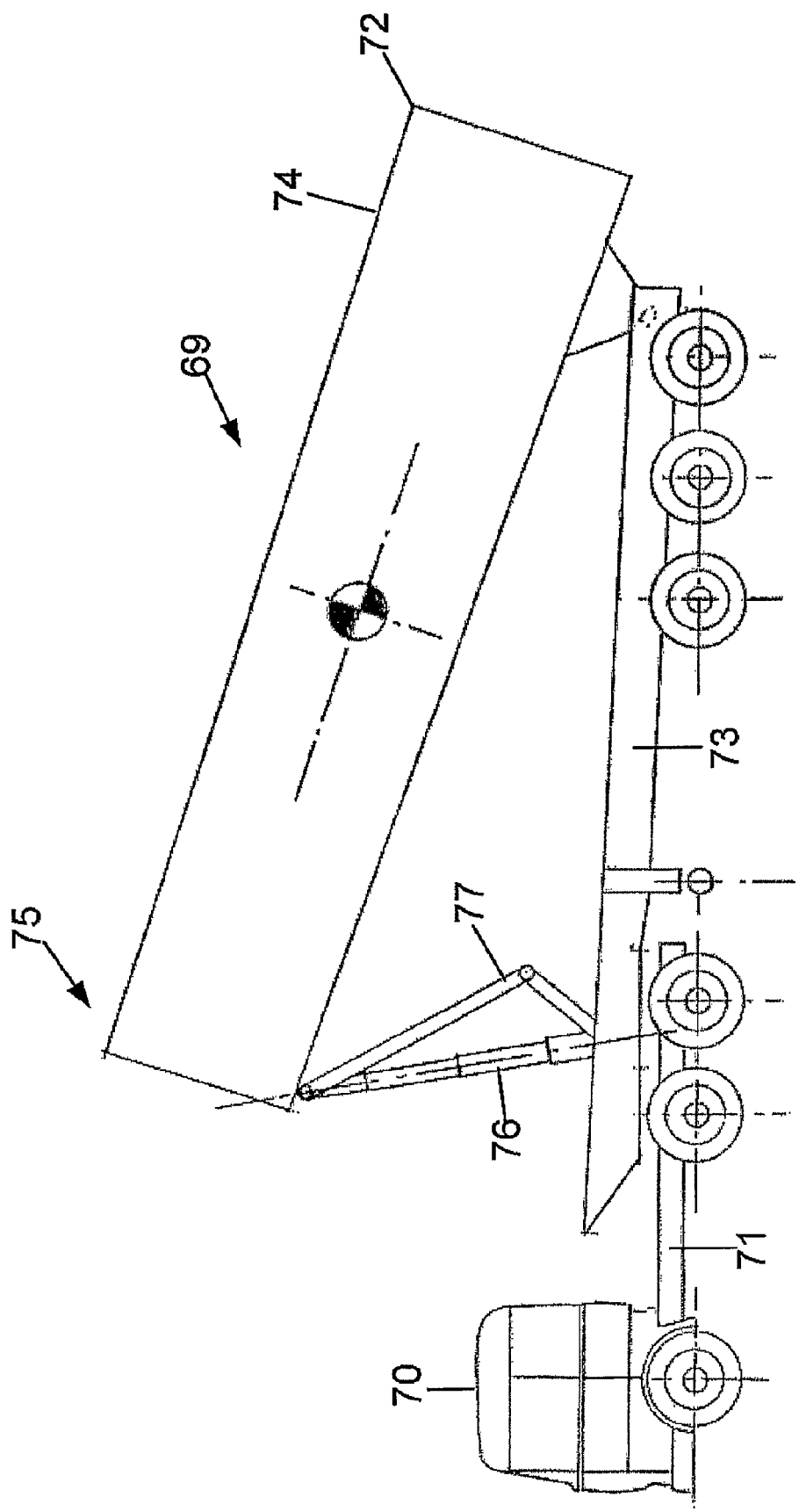
FIG. 25 is a schematic side view of the lorry of FIG. 22 with the container in a rearward tipping position.
Figure 26:
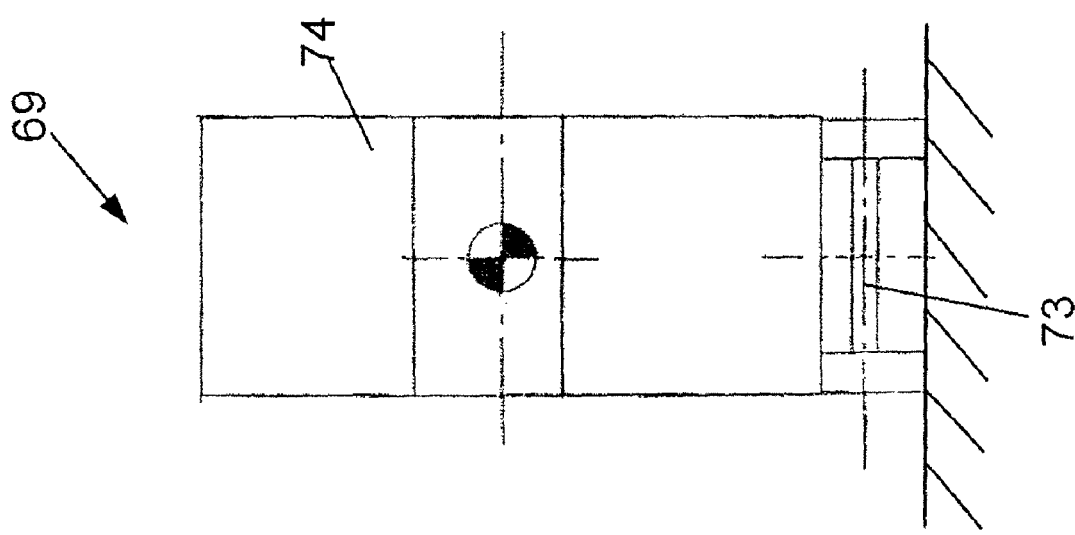
FIG. 26 is a schematic end view of the lorry of FIG. 25.

FIG. 24 shows the container 74 tipped and placed in a forward position, and FIGS. 25 and 26 show the container 74 tipped and displaced to a rearward position. In this embodiment, a hydraulic ram 76 is used in combination with an articulated arm or tipping hinge 77 to raise the front end 75 of the container 74, and reciprocal displacement means (not shown), e.g. an inclined or horizontal air spring/hydraulic ram arrangement as described above with reference to FIGS. 17 to 21, is connected solely to the rear mountings (not shown) of the trailer 72. In this embodiment the forward and rearward displacement of the container 74 may be at substantially similar speeds or at different speeds as described in relation to FIGS. 17 to 21.

Figure 27:
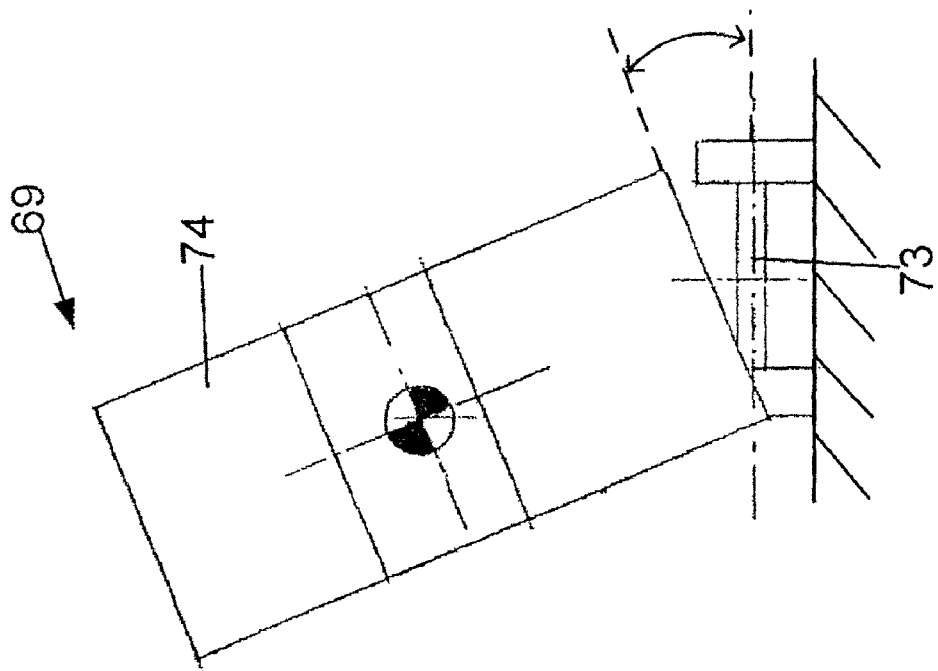
FIG. 27 is a schematic end view of the lorry of FIG. 25 undergoing sideways tilting of the trailer on a level surface.

FIG. 27 depicts the lorry 69 of FIGS. 25 and 26 when subjected to an event which has caused a sideways tilt of 23° to the ground, which is the calculated maximum angle to which the container 74 can tilted before roll over occurs. It will be appreciated that this maximum sideways tilt angle is again significantly greater than that of a conventional 44 tonne maximum gross weight articulated lorry. By reducing the angle to which the lorry container needs to be tipped to discharge the load a wider range of container types can be employed to suit a particular application than with conventional trailers.

A further enhancement to the trailer of the present invention over a conventional lorry is included in the lorry 69 depicted in FIG. 28. The lorry 69 is located on an inclined surface which produces an axle slope of 5° to the horizontal. In such circumstances a conventional lorry would be extremely unstable and likely to roll over. However, the lorry 69 incorporates an electronic and pneumatic levelling system (not shown) to adjust the height of the air suspension at either end of each axle to control the relative displacement of the chassis 73 and container 74 from the tyres at either end of each axle. The aim of the system is to ensure that the chassis 73 and thereby the container 74 remains as near to horizontal as possible when the lorry 69 is placed on uneven or sloping ground.

Overloading of load carrying vehicles has become an increasing problem in recent years. Many systems are currently available for weighing the load present in the trailer. For example, load sensing pads may be placed under the tipping hinge and/or under the hydraulic tipping ram. Whilst these systems work satisfactorily, the trailer of the present invention facilitates the use of a more simple, robust and reliable system. Thus, a further feature which could be incorporated in to a lorry in accordance with an embodiment of the present invention is weight monitoring means comprising an electronic sensor to detect the force (e.g. the hydraulic pressure) required to initiate rearward translational movement of the container initially and processing means to calculate the weight of the load held in the container from the magnitude of the force required.

Figure 12:
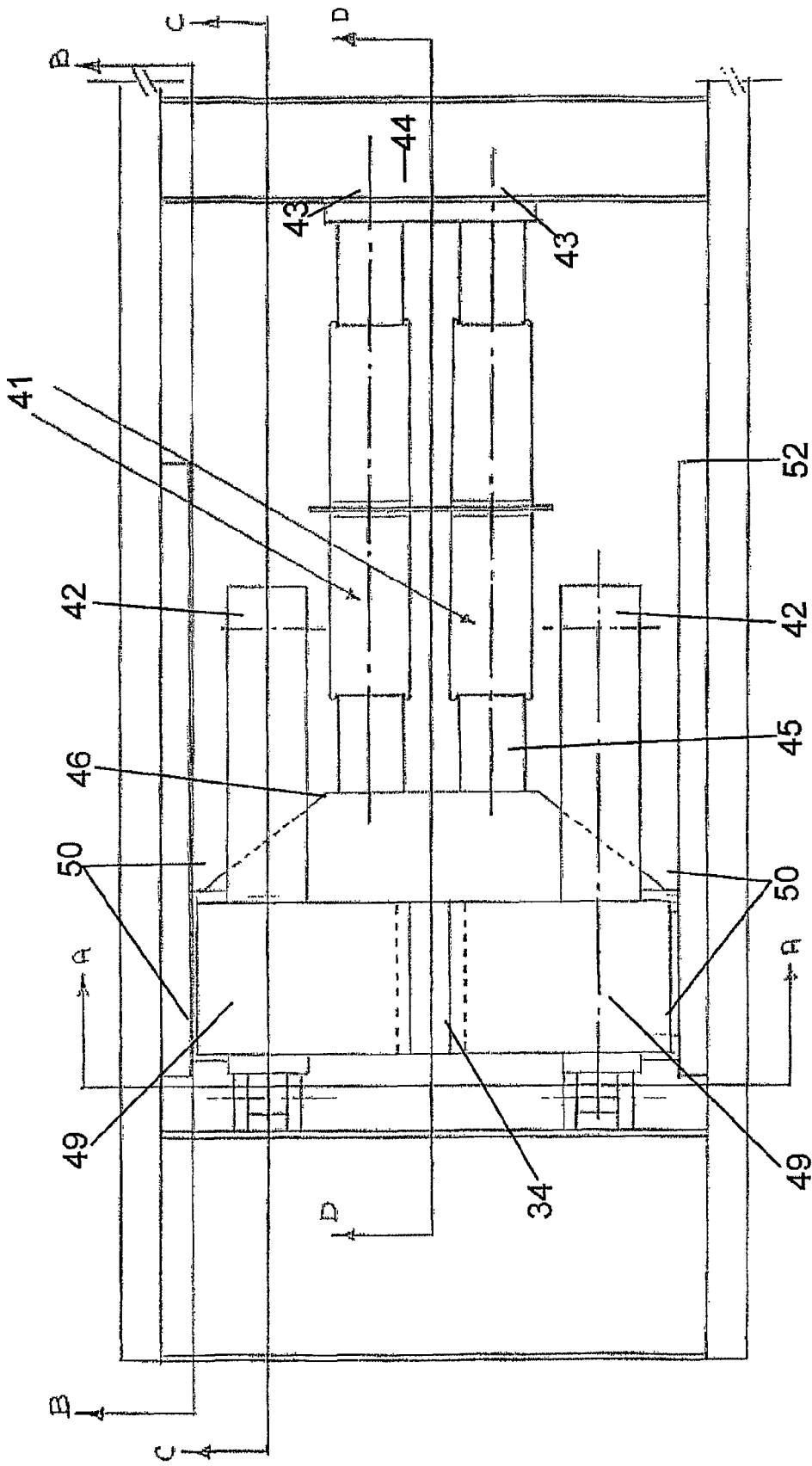
FIG. 12 is a schematic cross sectional plan view of a front portion of the trailer of the lorry of FIG. 6.
Figure 16:
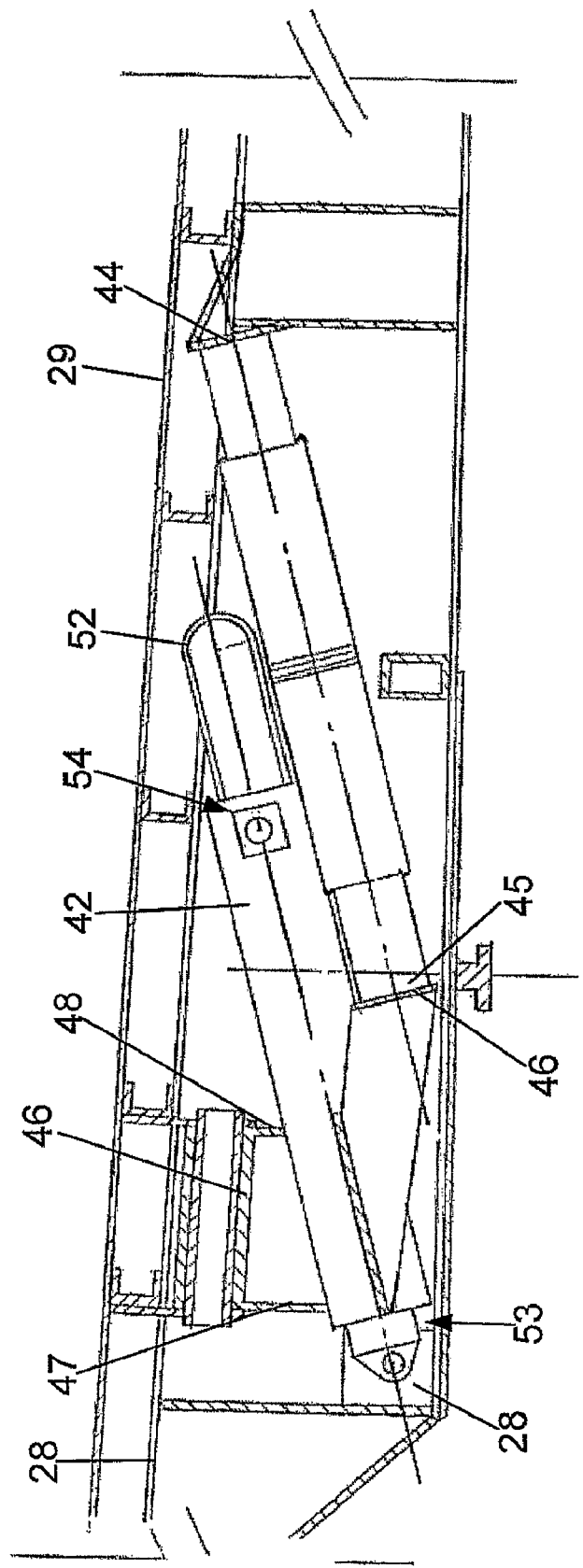
FIG. 16 is a schematic view along D-D of FIG. 12.
Figure 17:
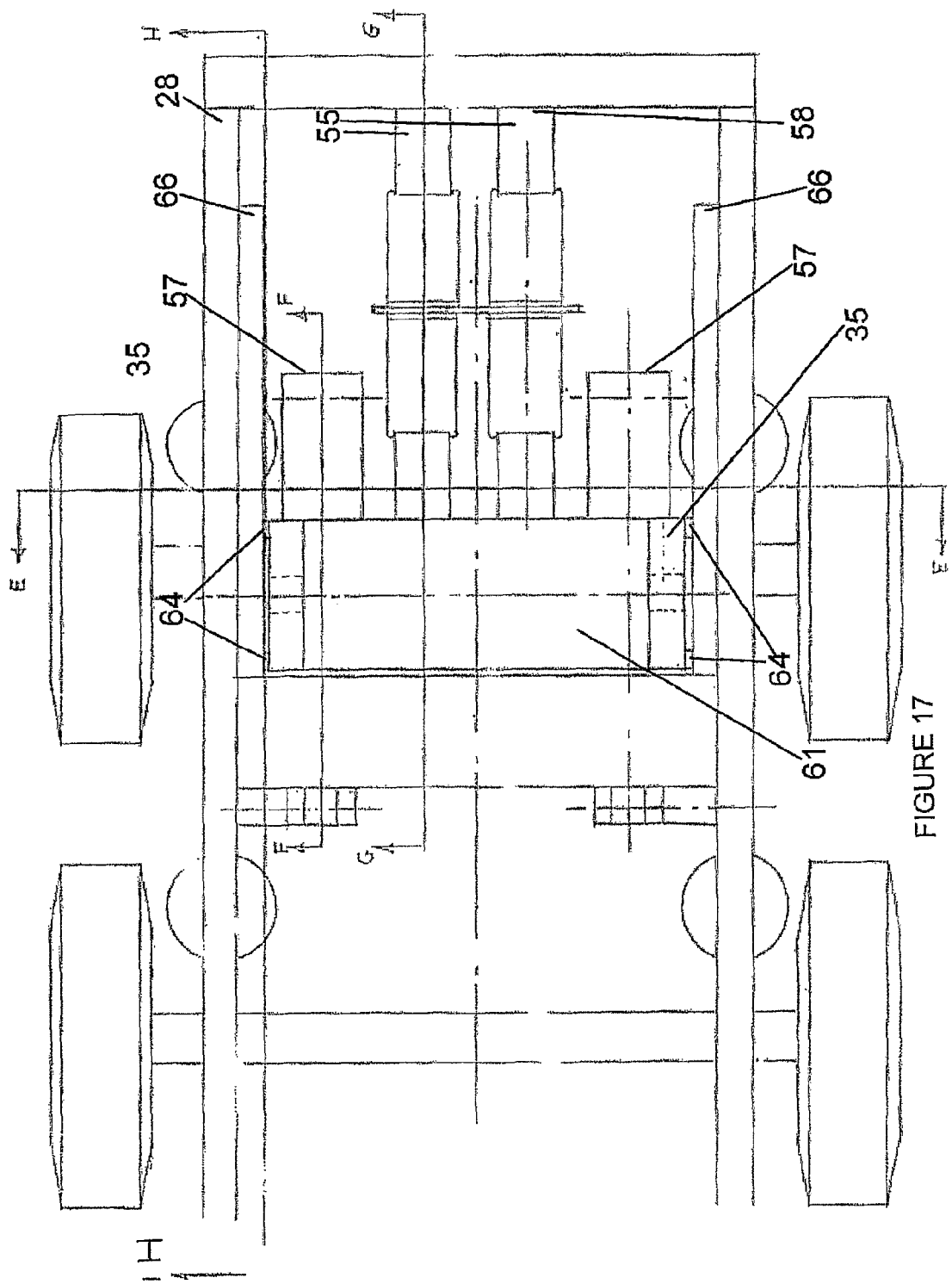
FIG. 17 is a schematic plan view of a rear portion of the trailer of the lorry of FIG. 6 with the trailer container removed.
Figure 18:
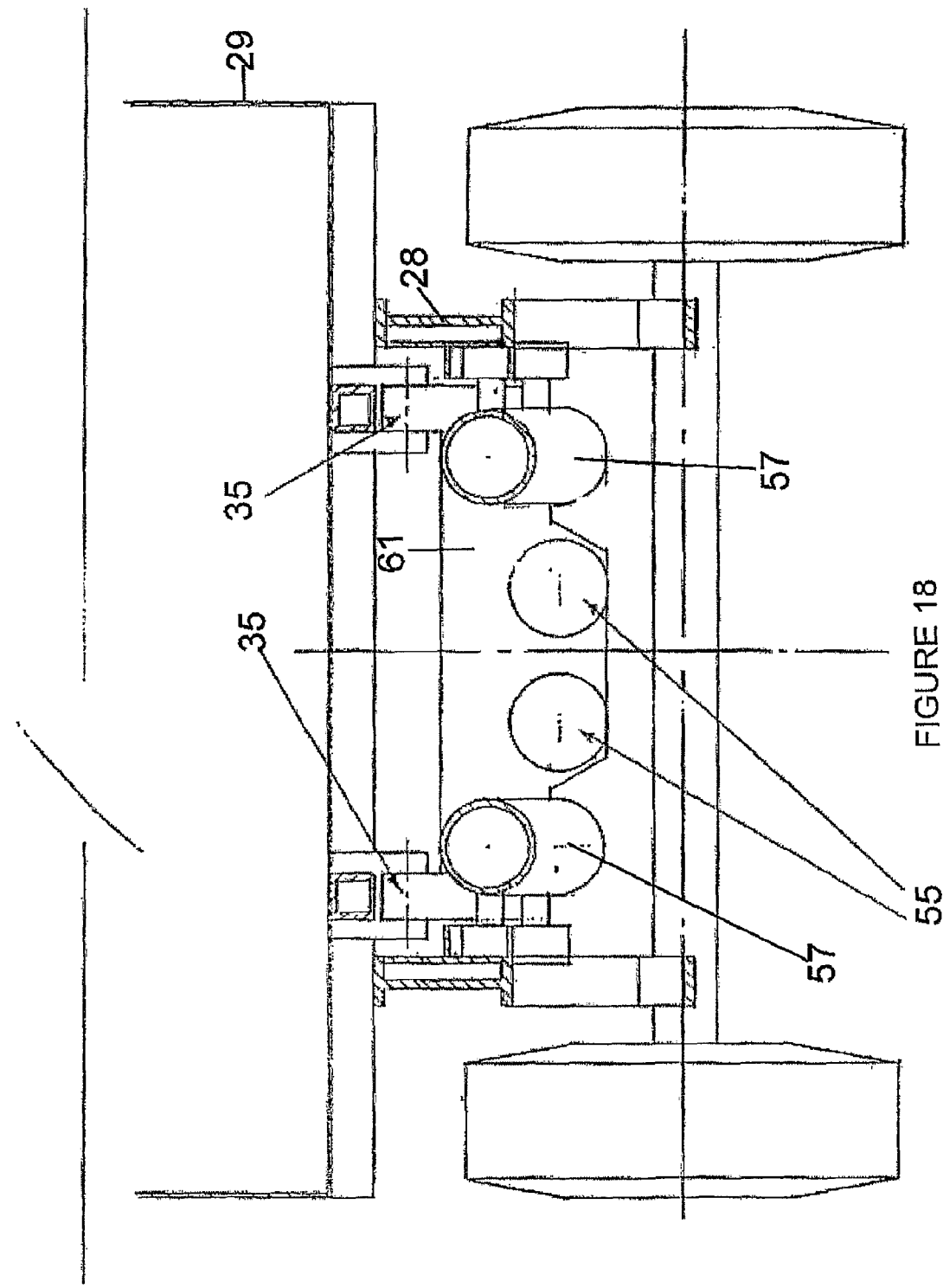
FIG. 18 is a schematic view along E-E of FIG. 17.

A third embodiment of a trailer in accordance with the present invention is shown in FIGS. 29 to 33. The general arrangement of components in this embodiment is similar to the arrangement shown in FIGS. 6 to 21 save for the use of a different form of displacement means. The front and rear pairs of inclined air springs 41, 55 shown in FIGS. 12 and 20 are replaced with means for utilising the hydraulic rams located in front and rear inclined tubes 42, 57 to displace the container 27 backwards and forwards. Accordingly, parts corresponding to those of FIGS. 6 to 21 are indicated by the same reference numerals increased by 100.

Figure 29:
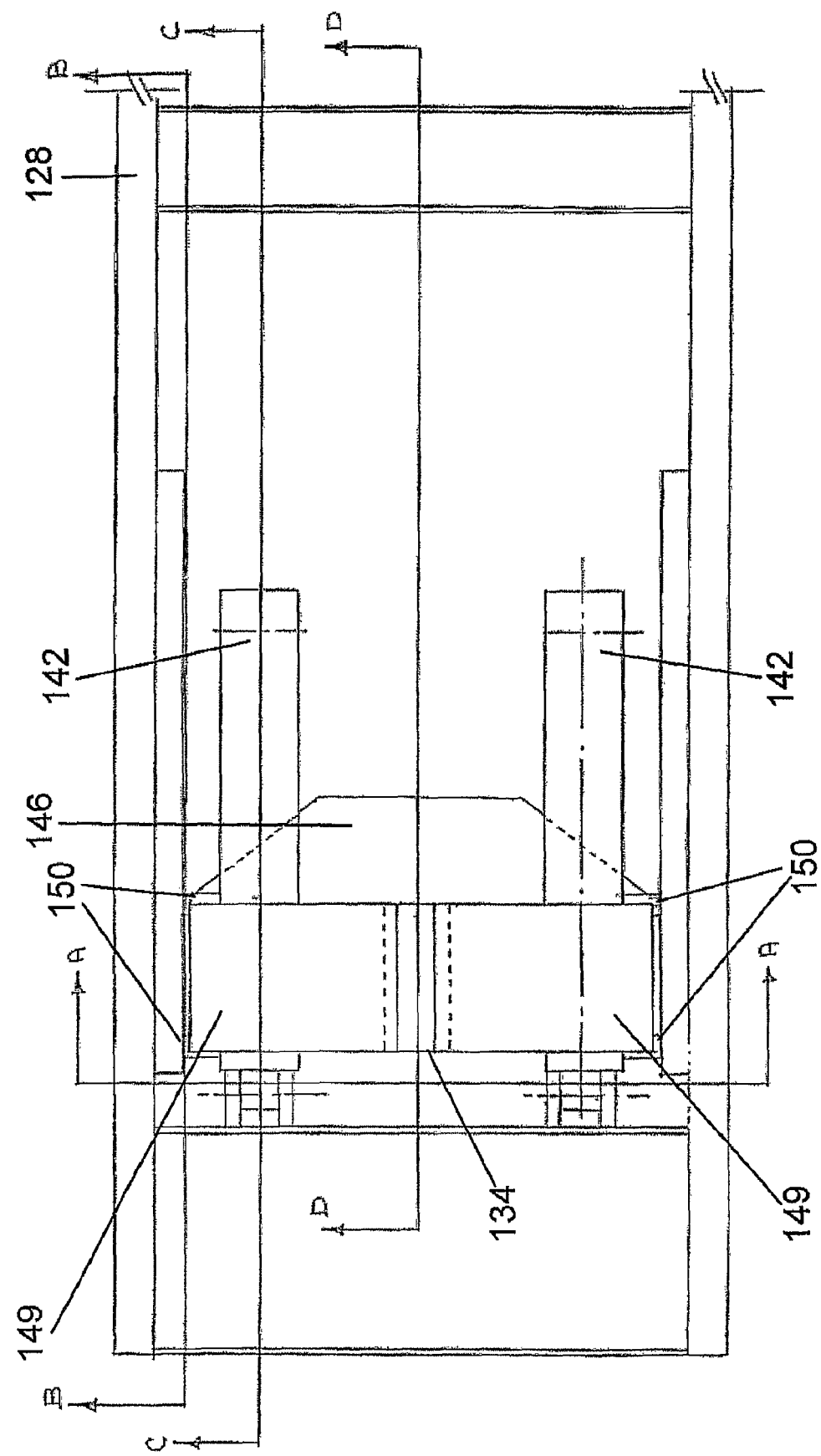
FIG. 29 is a schematic cross sectional plan view of a front portion of a trailer forming part of an articulated lorry according to an alternative embodiment of present invention.
Figure 30:
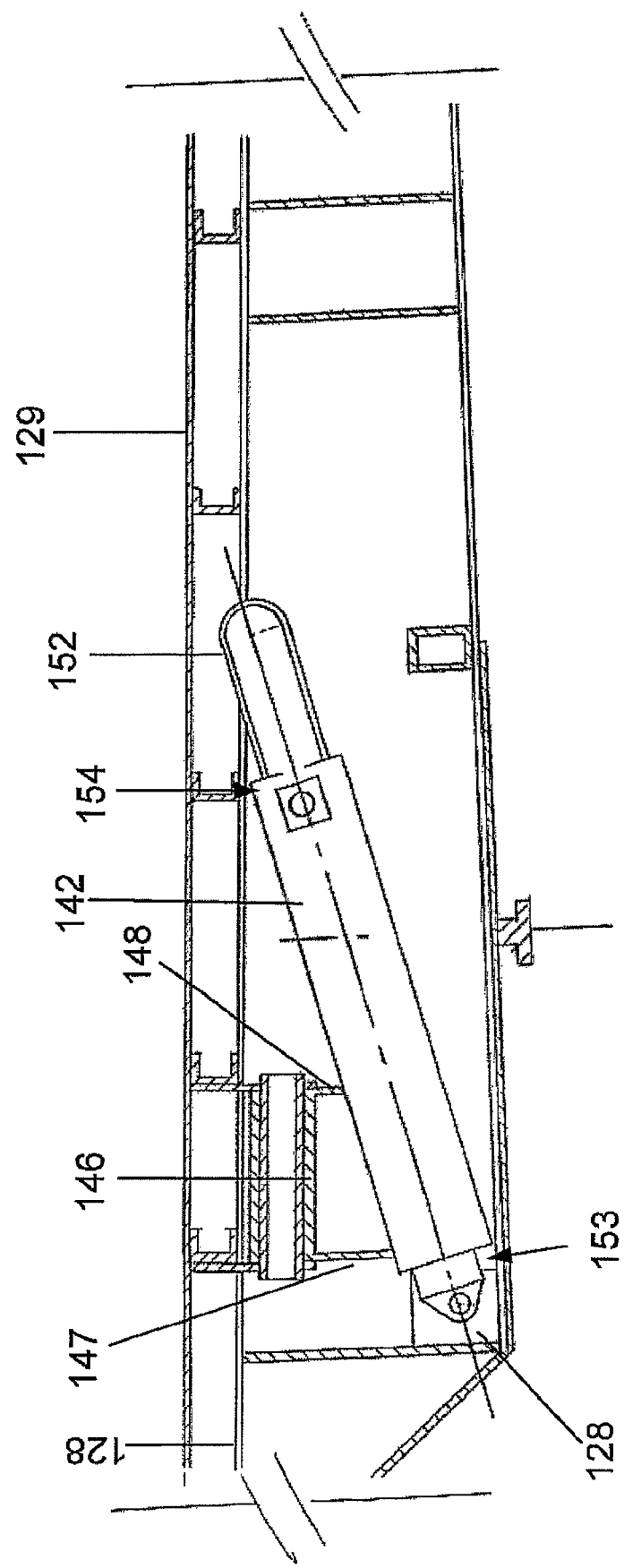
FIG. 30 is a schematic view along D-D of FIG. 29.

FIGS. 29 and 30 show a portion of a chassis 128 adjacent a front mounting 134 which is connected to an alternative design of displacement means to that shown in FIG. 12. The displacement means comprises a pair of hydraulic rams (not shown) located in inclined tubes 142. In this embodiment the hydraulic rams are used to move the container (not shown) forwards and rearwards with respect to the chassis 128. Support member 146 (comprising connected front and rear plates 147, 148) is pivotally connected via front mounting 134 to a plate 149 depending from the base 129 of the container 127 (not shown on FIGS. 29 and 30). Support member 146 is connected to pairs of spaced stud shafts 150, ends of which carry wheels (not shown in FIGS. 29 and 30) which are received in inclined channels 152 defined in the chassis 128. The exterior surfaces of the tubes 142 which house the hydraulic rams are connected to support member 146 and to the stud shafts 150. One end 153 of each hydraulic ram is connected to the chassis 128 and the opposite end 154 of each hydraulic ram is connected to the tube 142.

Figure 31:
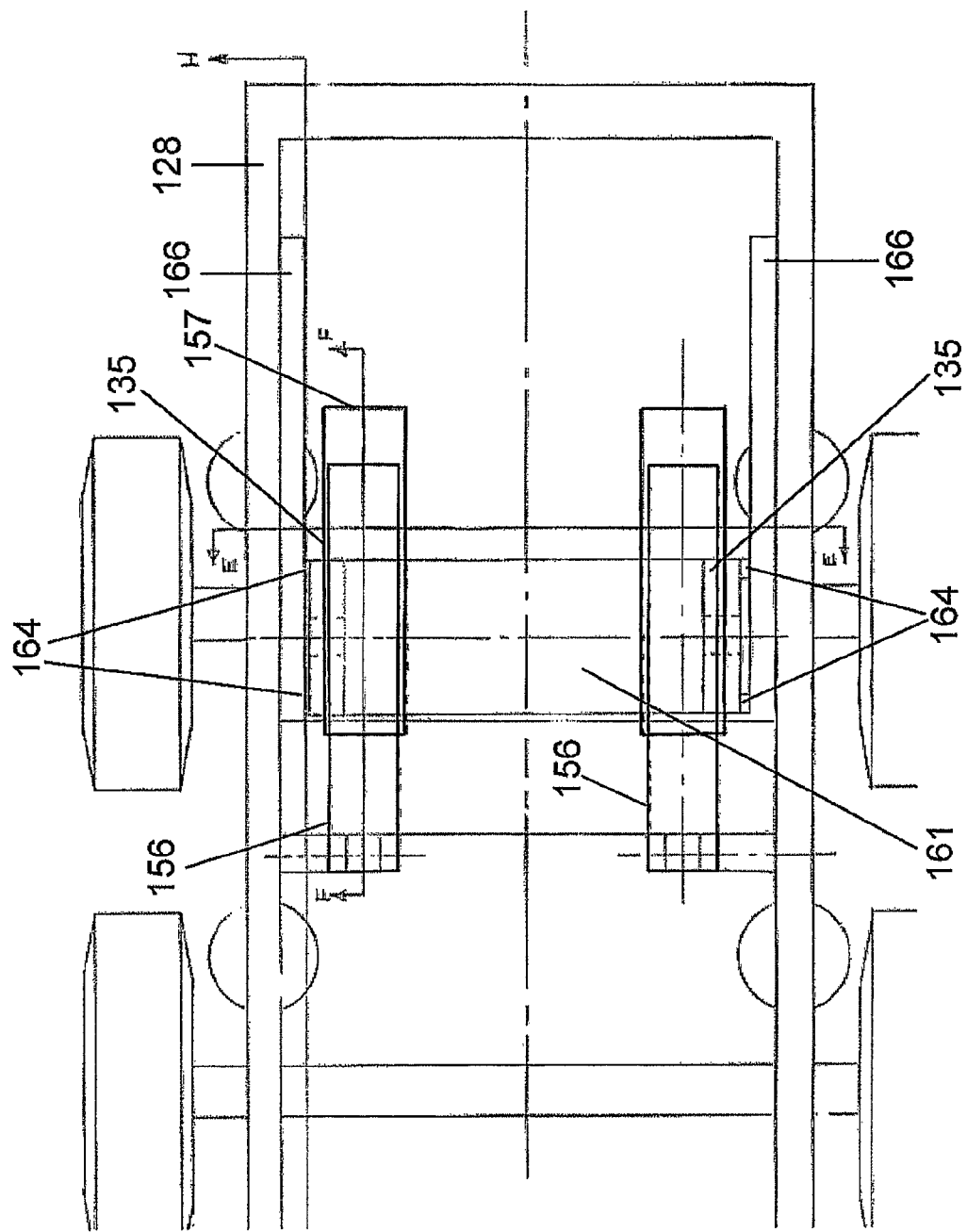
FIG. 31 is a schematic plan view of a rear portion of the trailer of the lorry of FIG. 29 with the trailer container removed.
Figure 32:
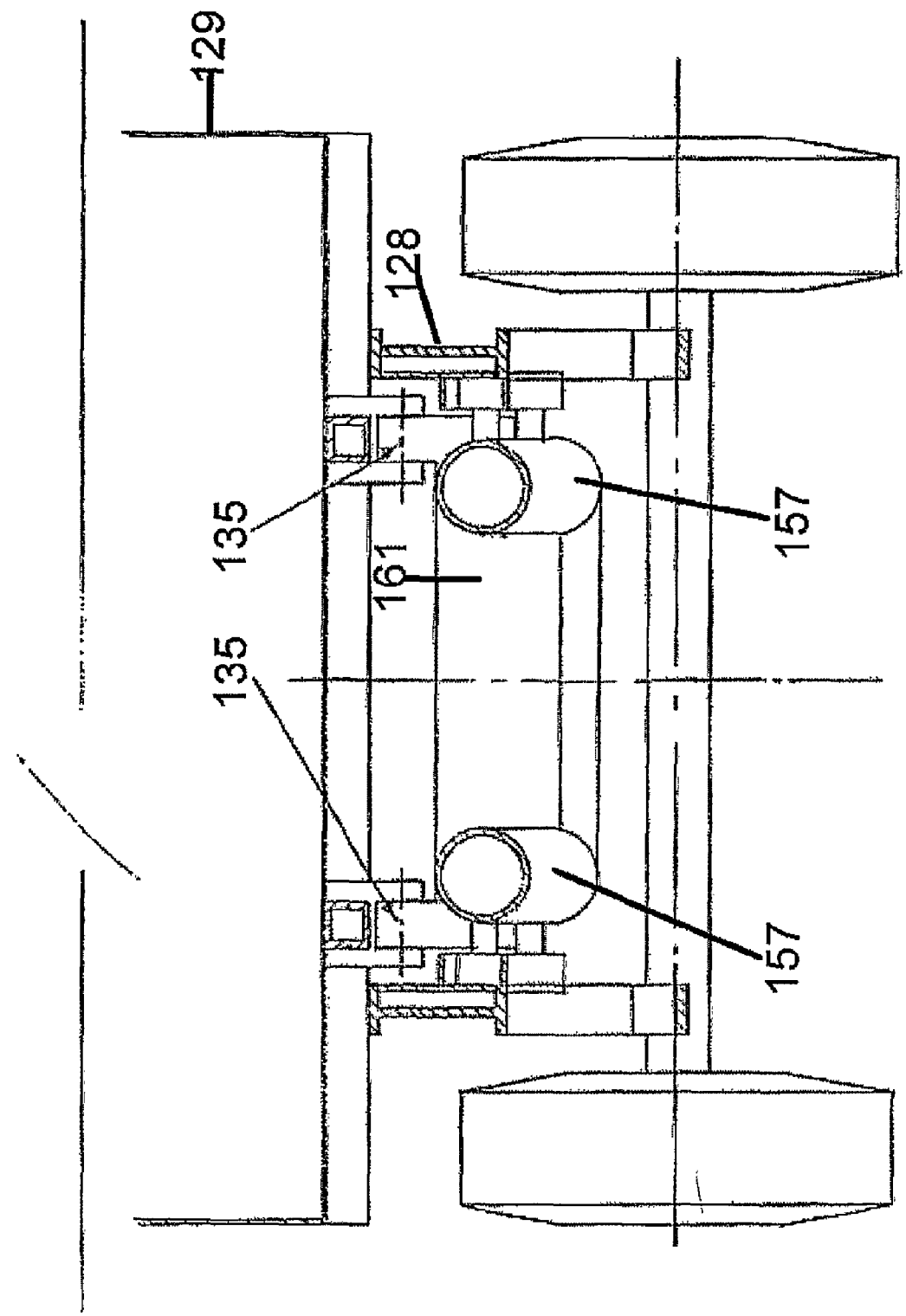
FIG. 32 is a schematic view along E-E of FIG. 31.

FIGS. 31 to 32 show a portion of the chassis 128 adjacent rear mountings 135. The rear mountings 135 are connected to similar displacement means to those connected to the front mounting 134. A pair of hydraulic rams 156 located in inclined tubes 157 are used to displace the container (not shown) forwards and backwards with respect to the chassis 128. Support member 161 is pivotally connected to the container 127 (not shown) via the rear mountings 135 which are located at either end of the support member 161. Support member 161 is also connected to pairs of spaced stud shafts 164, ends of which carry wheels 65 (not shown) which are received in inclined channels 166 defined in the chassis 128.

Figure 33:
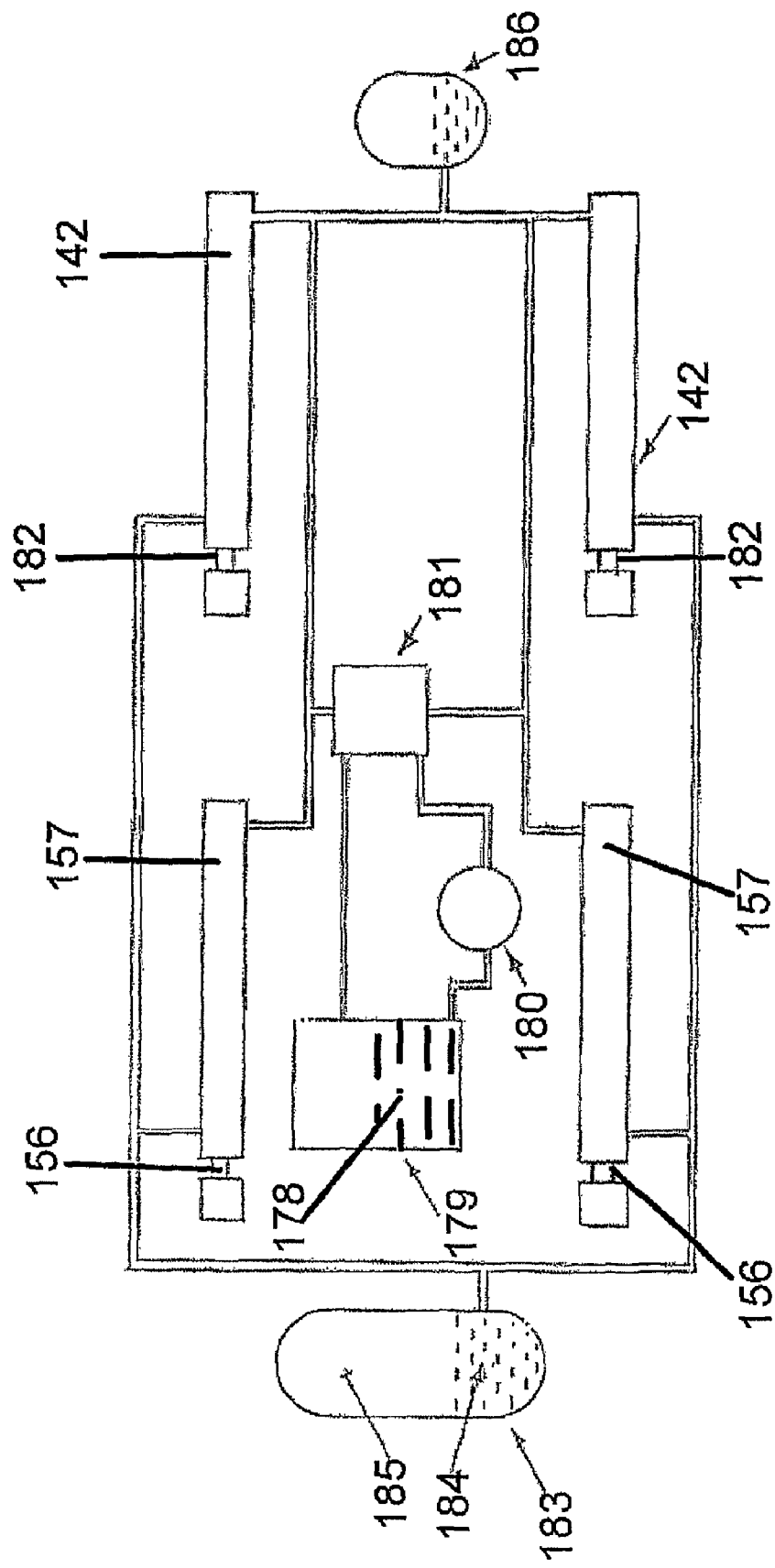
FIG. 33 is a schematic representation of a hydraulic circuit for use in the lorry of FIG. 29.

FIG. 33 is a schematic representation of a hydraulic circuit used to control the displacement means shown in FIGS. 29 to 32. To move the container 127 (not shown) rearwards with respect to the vehicle chassis 128 (not shown) oil 178 is fed from a reservoir 179 by a hydraulic pump 180 via control valve 181 to the hydraulic cylinders 142, 157. Hydraulic rams 182, 156 then extend out of cylinders 142, 157 and push the wheels, 151, 165 along the inclined channels 152, 166 so as to displace the container 127 upwardly and towards the rear of the chassis 128. The hydraulic cylinders 142, 157 are double acting and on the opposite side of the rams 182, 156 to the oil feed from the pump 180 is connected an air-oil accumulator 183. The air-oil accumulator 183 is a vertical cylinder partially filled with oil 184 and partially filled with inert gas 185 under pressure. As oil 178 is pumped into the hydraulic cylinders 142, 157 to move the container 127 rearwards oil from the opposite side of each ram 182, 156 is forced into the air-oil accumulator 183 compressing the inert gas 185 and increasing its pressure. As the hydraulic rams 182, 156 and the container 127 attached to the rams 182, 156 reach the end of their travel the control valve 181 directs the oil flow from the pump 180 and the hydraulic rams 182, 156 to the oil reservoir 179. The pressure that has now built up in the air-oil accumulator 183 forces the oil on the opposite side of the piston, in the hydraulic cylinder, back into the oil reservoir 179. The hydraulic cylinders 142, 157 now contract pulling the wheels, 151, 165 and thereby the container 127 forwards and down the inclined channels 152, 166 at a greater velocity than they ascended the inclined channels thus producing the desired quicker return action and leaving the load behind. As shown in FIG. 33, a further air-oil accumulator 186 can be placed in the hydraulic circuit between the control valve 181 and the hydraulic cylinders 142, 157 to cushion the effects of sudden changes in pressure which may occur during operation.

While the above embodiments of the present invention utilise reciprocal translational movement combined with reciprocal vertical movement such that the container follows an inclined path, it is envisaged that the container could be subject to reciprocal translational movement alone (i.e. rectilinear movement) and/or substantially horizontal translational movement. Such movement can be provided by appropriately reorientating the direction of travel of the air springs, hydraulic rams and wheels within the channels.

Furthermore, in some applications it may be desirable to employ reciprocal movement along a path which is arcuate when viewed from the side of the container. For example, the container may follow an upwardly arcuate path as the container is displaced rearwardly and a corresponding downwardly arcuate path as the container is displaced forwardly. Arcuate displacement could be provided by employing rotatable arms, such as radius arms, connected at one end to the front or rear mountings and at the other end to the chassis. The rotatable arms could be driven by any suitable means, e.g. air springs or hydraulic rams.

It will be understood that numerous modifications can be made to the embodiments of the invention described above without departing from the underlying inventive concept and that these modifications are intended to be included within the scope of the invention. For example, the air springs and hydraulic rams could be replaced with any suitable displacement means which can function to provide the appropriate reciprocal movement of the container, such as air bags, metal springs, leavers, cranks, connecting rods, cam and the like. While the above described embodiments each employ similar displacement means at the front and rear of the vehicle it will be appreciated that different types of displacement means may be used at each end of the vehicle. For example, the displacement means used in the first embodiment of the present invention employing hydraulic rams and air springs could be provided at the front of the vehicle and the displacement means used in the third embodiment employing double acting hydraulic cylinders linked to an air-oil accumulator could be provided at the rear of the vehicle, or vice versa. Furthermore, the present invention may be incorporated in to a wide range of different load carrying vehicles, such as articulated and non-articulated (i.e. rigid or fixed) lorries and tankers. The inventive trailer is considered eminently suitable for use in articulated lorries, for example 44 tonne maximum gross weight lorries or heavier. Furthermore, the inventive vehicle could be a lighter maximum gross weight vehicle, such as a six or eight wheel rigid tipper or tanker with a maximum gross weight in excess of 20 tonnes. Moreover, the present invention could also be applied to agricultural trailers, earth moving vehicles, mineral extractions vehicles and the like.

The invention claimed is:

1. A vehicle or trailer for transporting a load of fluent bulk material, comprising a chassis and a container mounted on said chassis, said container comprising a base, a plurality of load retaining walls defining a volume for receipt of said load and a discharge opening, the container being mounted to the chassis by at least one connector that permits reciprocal translational movement of the container relative to the chassis whilst mounted thereon between first and second positions so as to agitate the load and encourage it to flow out of the discharge opening, wherein the at least one connector is arranged to permit translational movement of the container from the first position to the second position more slowly than translational movement of the container from the second position to the first position.

2. A vehicle or trailer according to claim 1, wherein said load retaining walls comprise side and end walls and one of said side or end walls is hingedly mounted so as to be openable to provide said discharge opening.

3. A vehicle or trailer according to claim 1, wherein said load retaining walls comprise side and end walls and said discharge opening is defined by one of said side or end walls.

4. A vehicle or trailer according to claim 1, wherein said at least one connector comprises a mounting connected to displacement means to provide said reciprocal translational movement.

5. A vehicle or trailer according to claim 4, wherein said vehicle or trailer further comprises tipping means to tip said container about a pivot connected to said mounting.

6. A vehicle or trailer according to claim 5, wherein said pivot defines a pivot axis transverse to a longitudinal axis of the container.

7. A vehicle or trailer according to claim 4 wherein said mounting is attached to said container and said displacement means is attached to said chassis.

8. A vehicle or trailer according to claim 4, wherein the displacement means comprises one or more hydraulic ram or air spring.

9. A vehicle or trailer according to claim 4, wherein an end of the displacement means is connected to the chassis and an opposite end of the displacement means is connected to the mounting.

10. A vehicle or trailer according to claim 4, wherein an end of the displacement means is connected to the chassis and an opposite end of the displacement means is connected to a rotatable arm which is connected to the mounting.

11. A vehicle or trailer according to claim 4, wherein the displacement means is connected to a projection which is received in a channel defined by the chassis.

12. A vehicle or trailer according to claim 11, wherein said channel extends in a direction which is substantially parallel to a direction of translational movement of the container.

13. A vehicle or trailer according to claim 11, wherein said projection comprises a stub shaft supporting a rotatable wheel.

14. A vehicle or trailer according to claim 4, wherein the displacement means comprises first displacement means to move said container from the first position to the second position and second displacement means to displace said container from the second position to the first position.

15. A vehicle or trailer according to claim 14, wherein the first displacement means comprises a pair of hydraulic rams and the second displacement means comprises a pair of air springs.

16. A vehicle or trailer according to claim 15, wherein said pair of air springs is located inboard of said pair of hydraulic rams.

17. A vehicle or trailer according to claim 1, wherein said at least one connector permits reciprocal substantially vertical movement in combination with said translational movement of the container relative to the chassis.

18. A vehicle or trailer according to claim 17, wherein said combination of substantially vertical movement with said translational movement causes said container to follow a generally arcuate path.

19. A vehicle or trailer according to claim 1, wherein said at least one connector permits only rectilinear translational movement of the container relative to the chassis.

20. A vehicle or trailer according to claim 1, wherein said chassis is supported on wheels mounted on at least one axle connected to said chassis.

21. A vehicle or trailer according to claim 20, wherein said at least one axle is connected to the chassis by a suspension system which is connected to suspension levelling means to monitor an angular offset of the at least one axle from horizontal and control said suspension system so as to minimise the angular offset from horizontal.

22. A vehicle or trailer according to claim 1, wherein weight monitoring means is provided comprising an electronic sensor to detect the force required to initiate translational movement of the container initially from the first position to the second position and processing means to calculate the weight of the load held in the container from the magnitude of said force.

23. A vehicle or trailer according to claim 1, wherein the at least one connector permits said reciprocal translational movement of the container along an axis which is substantially parallel to a longitudinal axis of the chassis.

24. A vehicle or trailer according to claim 1, wherein the at least one connector permits said reciprocal translational movement of the container along an axis which is transverse to a longitudinal axis of the chassis.

25. A vehicle or trailer according to claim 24, wherein the at least one connector permits said reciprocal translational movement of the container along an axis which is substantially perpendicular to said longitudinal axis of the chassis.

26. A vehicle or trailer for transporting a load of fluent bulk material, comprising a chassis and a container mounted on said chassis, said container comprising a base, a plurality of load retaining walls defining a volume for receipt of said load and a discharge opening, the container being mounted to the chassis by at least one connector that permits reciprocal translational movement of the container relative to the chassis whilst mounted thereon between first and second positions so as to agitate the load and encourage it to flow out of the discharge opening, wherein said at least one connector permits reciprocal substantially vertical movement in combination with said translational movement of the container relative to the chassis, wherein the at least one connector is arranged to permit translational movement of the container from the first position to the second position more slowly than translational movement of the container from the second position to the first position, and wherein said at least one connector permits only rectilinear translational movement of the container relative to the chassis.

27. A method of discharging a load from a vehicle or trailer comprised of a chassis and a container mounted on said chassis, said container comprising a base, a plurality of load retaining walls defining a volume for receipt of said load and a discharge opening, the container being mounted to the chassis by at least one connector, the method comprised of causing reciprocal translational movement of the container relative to the chassis whilst mounted thereon between first and second positions so as to agitate the load and encourage it to flow out of the discharge opening, wherein translational movement of the container from the first position to the second position occurs more slowly than translational movement of the container from the second position to the first position.

28. A method according to claim 27, wherein said container undergoes reciprocal substantially vertical movement in combination with said reciprocal translational movement relative to the chassis.

29. A method according to claim 28, wherein said combination of substantially vertical movement with said translational movement causes said container to follow a generally arcuate path.

30. A method according to claim 28, wherein said container undergoes only rectilinear translational movement relative to the chassis.

31. A method according to claim 27, wherein said container undergoes reciprocal translational movement along an axis which is substantially parallel to a longitudinal axis of the chassis.

32. A method according to claim 27, wherein said container undergoes reciprocal translational movement along an axis which is transverse to a longitudinal axis of the chassis.

33. A method according to claim 32, wherein said container undergoes reciprocal translational movement along an axis which is substantially perpendicular to said longitudinal axis of the chassis.

34. A method of discharging a load from a vehicle or trailer comprised of a chassis and a container mounted on said chassis, said container comprising a base, a plurality of load retaining walls defining a volume for receipt of said load and a discharge opening, the container being mounted to the chassis by at least one connector, the method comprised of causing reciprocal translational movement of the container relative to the chassis whilst mounted thereon between first and second positions so as to agitate the load and encourage it to flow out of the discharge opening, wherein said container undergoes reciprocal substantially vertical movement in combination with said translational movement relative to the chassis, and wherein the at least one connector is arranged to permit translational movement of the container from the first position to the second position more slowly than translational movement of the container from the second position to the first position.

35. A method according to claim 34, wherein said combination of substantially vertical movement with said translational movement causes said container to follow a generally arcuate path.

36. A method according to claim 34, wherein said container undergoes only rectilinear translational movement relative to the chassis.

* * * * *